United States Patent
Shu et al.

(10) Patent No.: US 12,015,304 B2
(45) Date of Patent: Jun. 18, 2024

(54) POWER SUPPLY SYSTEM, POWER SUPPLY METHOD, CONTROL APPARATUS, AND COMPUTER STORAGE MEDIUM

(71) Applicant: Huawei Digital Power Technologies Co., Ltd., Shenzhen (CN)

(72) Inventors: Zhou Shu, Dongguan (CN); Ran Li, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/969,194

(22) Filed: Oct. 19, 2022

(65) Prior Publication Data

US 2023/0122255 A1 Apr. 20, 2023

(30) Foreign Application Priority Data

Oct. 20, 2021 (CN) .......................... 202111220863.6

(51) Int. Cl.
*H02J 9/06* (2006.01)
*H02J 3/01* (2006.01)
*H02J 3/18* (2006.01)
*H02J 3/32* (2006.01)

(52) U.S. Cl.
CPC ................ *H02J 9/062* (2013.01); *H02J 3/01* (2013.01); *H02J 3/18* (2013.01); *H02J 3/32* (2013.01)

(58) Field of Classification Search
CPC ...... H02J 9/062; H02J 3/01; H02J 3/18; H02J 3/32; H02J 3/381

USPC .......................................................... 307/43
See application file for complete search history.

(56) References Cited

U.S. PATENT DOCUMENTS

| | | | |
|---|---|---|---|
| 2004/0084965 | A1 | 5/2004 | Welches et al. |
| 2012/0181871 | A1 | 7/2012 | Johansen et al. |
| 2014/0368043 | A1* | 12/2014 | Colombi ............... H02J 3/1864 307/66 |
| 2017/0163086 | A1 | 6/2017 | Bach |
| 2018/0301930 | A1 | 10/2018 | Gonzalez |
| 2019/0067988 | A1 | 2/2019 | Ghosh et al. |
| 2019/0190311 | A1 | 6/2019 | Kao |
| 2021/0152017 | A1 | 5/2021 | Berger et al. |

FOREIGN PATENT DOCUMENTS

| | | |
|---|---|---|
| CN | 107887968 A | 4/2018 |
| CN | 104659899 B | 8/2018 |
| CN | 108463944 A | 8/2018 |
| CN | 108736467 A | 11/2018 |
| CN | 109950966 A | 6/2019 |
| EP | 2666230 B1 | 4/2020 |

* cited by examiner

Primary Examiner — Richard Tan
(74) Attorney, Agent, or Firm — Conley Rose, P.C.

(57) ABSTRACT

A power supply system includes a plurality of parallelly-connected uninterruptible power supplies (UPSs), where each UPS collects a first current of the UPS within a collection period in a first duration. In a current equalization period in the first duration, a direct current to alternating current conversion module is controlled to output a first compensation current, where the first compensation current includes at least one of a first compensation reactive current component or a first quantity of first compensation harmonic components.

20 Claims, 13 Drawing Sheets

POWER SUPPLY SYSTEM, POWER SUPPLY METHOD, CONTROL APPARATUS, AND COMPUTER STORAGE MEDIUM

CROSS-REFERENCE TO RELATED APPLICATION

This application claims priority to Chinese Patent Application No. 202111220863.6, filed on Oct. 20, 2021, which is hereby incorporated by reference in its entirety.

TECHNICAL FIELD

This application relates to the field of energy technologies, and in particular, to a power supply system, a power supply method, a control apparatus, and a computer storage medium.

BACKGROUND

To provide stable power supply to a load, an uninterruptible power supply (UPS) emerges. With the improvement of reliability of a power grid, the UPS can run in an economical (ECO) mode. In one approach, a UPS runs in the ECO mode. If a power grid side is normal, electric energy on the power grid side is directly provided to the load by using a bypass switch module in the UPS. If the power grid side is abnormal, electric energy stored in a battery in the UPS may be provided to the load after being processed by a direct current to direct current (DC-DC) conversion module and a direct current to alternating current (DC-AC) conversion module. When the UPS runs in the ECO mode, power supply efficiency is high, and loss of functions of a power supply link is low.

In some approaches, a power supply system may include a plurality of parallelly-connected UPSs. Because the UPSs run in the ECO mode, a large harmonic current or reactive current may be injected into the power grid at the load. As a result, the power grid may be polluted. The UPS in the power supply system can use the DC-AC conversion module to compensate a current harmonic or reactive current in the power grid, to minimize the pollution to the power grid. To improve reliability and a loading capability of the power supply system, current equalization adjustment is performed on currents provided by the plurality of UPSs in the power supply system to the load. In this process, when the UPSs use the DC-AC conversion module to compensate the current harmonic or reactive current in the power grid, the pollution to the power grid is not significantly improved, and even the pollution to the power grid becomes more serious.

SUMMARY

This application provides a power supply system, an uninterruptible power supply, a power supply method, and a medium, which have high power supply efficiency and a high loading capability, minimize pollution to a harmonic current and a reactive current of a power grid, and do not require another component.

According to a first aspect, this application provides a power supply system. The system includes a plurality of uninterruptible power supplies UPSs. Each UPS in the plurality of UPSs includes at least an input terminal, a control module, a bypass switch module, a direct current to alternating current conversion module, a collection module, and an output terminal. An input terminal of each UPS is connected to a power grid by using a first node, an output terminal of each UPS is connected to a load by using a second node, and the power grid is configured to provide an alternating current to each UPS. One terminal of the bypass switch module is connected to the input terminal, and the other terminal of the bypass switch module is connected to the output terminal. The bypass switch module is configured to connect the power grid to the load under control of the control module. The collection module is connected to a collection point, and configured to collect a current at the collection point under the control of the control module. The collection point is disposed between the first node and the second node. The collection point may be an input terminal or an output terminal of a UPS to which the control module belongs, any point between the input terminal and the first node, any point between the output terminal and the second node, or any point on a branch in which the bypass switch module is disposed between the input terminal and the output terminal.

The direct current to alternating current conversion module is connected to the output terminal, and configured to output a current to the output terminal under the control of the control module. The control module is configured to control, in the collection period in a first duration, the control module to collect a first current at the collection point, and determine a harmonic component and/or a reactive current component of the first current; and control, in a current equalization period in the first duration, the direct current to alternating current conversion module to output a first compensation current. The first compensation current includes a first compensation reactive current component and/or a first quantity of first compensation harmonic components. The first quantity is less than or equal to a quantity of harmonic components of the first current, one first compensation reactive current component in the first quantity of first compensation harmonic components and one harmonic component of the first current have a same frequency and opposite amplitudes, and the first compensation reactive current component and the reactive current component have a same frequency and opposite amplitudes. Therefore, a reactive current component in the power grid may be compensated, and/or some or all harmonic components in the power grid may be compensated. The control module is further configured to adjust, in the current equalization period, duration in which the bypass switch module connects the power grid to the load, to balance currents output by output terminals of different UPSs in the plurality of UPSs, or balance currents output by bypass switch modules of the different UPSs. The current equalization period does not completely overlap the collection period.

Generally, in a scenario in which a power supply system provides an alternating current to a load, a waveform of a current in a cable in an ideal state is a sine periodic wave, and the current may be referred to as a fundamental current. However, due to factors such as connection to a load, the waveform of the current in the cable may be distorted. In this case, the waveform of the current in the cable is a non-sine periodic wave, and a Fourier series expansion form of the current in the cable may include a sine periodic wave (that is, a fundamental wave) and one or more harmonics in an ideal state, a waveform of each harmonic is also a sine periodic wave, and frequency is an integer multiple of the fundamental frequency. The harmonic may be referred to as a harmonic component in the current, a harmonic current, a current harmonic, or the like. The fundamental current includes an active current component and a reactive current component. The active current component may refer to a current generated when a load is running, and the reactive current may refer to a current generated when power is consumed by a non-load component.

In a current equalization adjustment process of the plurality of UPSs in the power supply system, a current output by the UPS may be doped with a harmonic component. In this case, a harmonic component or a reactive current component determined based on a current between the output terminal and the load may not reflect a harmonic component or a reactive current component caused by the load to the power grid. The power supply system provided in this application collects, in the collection period in the first duration, a current output by each UPS or an output current, and determines a harmonic component and/or a reactive current component that enters each UPS and that is caused by the load. The power supply system performs current equalization adjustment in the current equalization period in the first duration. The current equalization period may not completely overlap the collection period. Therefore, in this design, the current collected in the collection period may reflect the harmonic component or the reactive current component caused by the load to the power grid. This improves compensation effect on the harmonic component or the reactive current component in the power grid in the current equalization period. Each UPS outputs an equalization current in the current equalization period, and this improves the reliability of the power supply system and improves a loading capability. Each UPS may output compensation current to the load in the current equalization period, to compensate the harmonic component and/or the reactive current component that enters the UPS and that is caused by the load. Compensation currents output by all UPSs may compensate the harmonic component or the reactive current component caused by the load to the power grid, minimize pollution to a harmonic current and a reactive current caused by the load to the power grid, and improve quality of the power grid. This design may enable the power supply system to perform the current equalization adjustment and compensate the power grid at the same time, to improve the power supply efficiency and the loading capability of the power supply system, and improve the quality of the power grid. The UPS usually includes a bypass switch module, a direct current to alternating current conversion module, a collection module, and the like. The control module may control the bypass switch module to output, to the load by using the output terminal, a current provided by the power grid. This enables the UPS to work in ECO mode. In the ECO mode, the control module may also control the direct current to alternating current conversion module to output the compensation current. That is, both the bypass switch module and the direct current to alternating current conversion module inside the UPS may output currents, and no additional component is required to compensate the power grid.

In a possible design, the control module is further configured to control, in the collection period based on a predetermined harmonic component and/or reactive current component, the direct current to alternating current conversion module to output a second compensation current. The second compensation current includes a second compensation reactive current component and/or a second quantity of second compensation harmonic components. The second quantity is less than or equal to a quantity of predetermined harmonic components, and one second compensation reactive current component in the second quantity of second compensation harmonic components and one harmonic component of the predetermined harmonic components have a same frequency and opposite amplitudes; and the second compensation reactive current component and the predetermined reactive current component have a same frequency and opposite amplitudes. The predetermined harmonic component and/or reactive current component are/is determined based on a current at the collection point in a collection period in a second duration, and an end moment of the second duration is a start moment of the first duration.

In this embodiment, each UPS may run in a plurality of first durations, and the control module may control, in a collection period in current first duration, based on a harmonic component or a reactive current component that is determined in a first duration preceding the current first duration, the direct current to alternating current conversion module to output a compensation current that is used to compensate a harmonic component or a reactive current component determined in a previous first duration. In this design, the direct current to alternating current conversion module may output the compensation current in both the collection period and the current equalization period. This improves the quality of the power grid.

In a possible design, each UPS in the power supply system performs the current equalization adjustment in the current equalization period. This application provides at least two current equalization adjustment manners. In an application process, different current equalization adjustment manners may be used depending on an actual application scenario. In the current equalization adjustment process, the current equalization adjustment in the power supply system may be implemented by the control module to control the duration in which the bypass switch module connects the power grid to the load, without additional component.

In a first manner, the control module adjusts, based on currents output by output terminals of all the UPSs and a second current output by the output terminals of the UPSs, the duration in which the bypass switch module connects the power grid to the load. It can be learned that each UPS in the power supply system may perform the current equalization adjustment based on the currents output by the output terminals of all the UPSs, so that the currents output by the output terminals of the different UPSs are equalized. In an application process, if the second current is a minimum value of the currents output by the output terminals of all the UPSs, the control module controls the duration in which the bypass switch module connects the power grid to the load to be equal to a duration of the current equalization period. If the second current is greater than the minimum value, the control module reduces, based on duration of the current equalization period, the duration in which the bypass switch module connects the power grid to the load.

In a second manner, the control module adjusts, based on currents output by bypass switch modules of all the UPSs and a third current output by the bypass switch modules, the duration in which the bypass switch module connects the power grid to the load. It can be learned that each UPS in the power supply system may perform the current equalization adjustment based on the currents output by the bypass switch modules of all the UPSs, so that the currents output by bypass switch modules of the different UPSs are equalized. In an application process, if the third current is a minimum value of the currents output by the bypass switch modules of all the UPSs, the control module controls the duration in which the bypass switch module connects the power grid to the load to be equal to a duration of the current equalization period. If the third current is greater than the minimum value, the control module reduces, based on a duration of the current equalization period, the duration in which the bypass switch module connects the power grid to the load.

In a possible design, the bypass switch module includes a first switch and a second switch. One terminal of the first switch is connected to the input terminal, and the other terminal is connected to the output terminal. The second switch is connected in parallel to the first switch. The control module is separately connected to control terminals of the first switch and the second switch. A current transmission direction when the first switch is turned on is opposite to a current transmission direction when the second switch is turned on. The collection period includes a plurality of alternating current cycles, and each alternating current cycle includes a positive half cycle and a negative half cycle. Each UPS may also supply power to the load in the collection period. The control module is further configured to provide, in the collection period based on a preset first conduction angle, a first control signal to the first switch, where the first conduction angle is an electrical angle between a start moment at which a level of the first control signal in the positive half cycle is a first level and an end moment of the positive half cycle; the first level is a level that is used to drive the first switch to be in an on state; the first control signal is used to drive, in a period corresponding to the first conduction angle in each positive half cycle, the first switch to connect the power grid to the load, and drive, in each negative half cycle, the first switch to be in an off state; or provide, based on a preset second conduction angle, a second control signal to the second switch, where the second conduction angle is an electrical angle between a start moment at which a level of the second control signal in the negative half cycle is a first level and an end moment of the negative half cycle; the first level is a level used to drive the second switch to be in an on state; and the second control signal is used to drive, in a period corresponding to the second conduction angle in each negative half cycle, the second switch to connect the power grid to the load, and drive, in each positive half cycle, the second switch to be in an off state. In an application process, the first conduction angle may be equal to an electrical angle at the positive half cycle, and the second conduction angle may be equal to an electrical angle at the negative half cycle.

In a possible design, the current equalization period includes a plurality of alternating current cycles. When the control module controls, in the current equalization period, the duration in which the bypass switch module connects the power grid to the load to be equal to a duration of the current equalization period, the control module is configured to provide the first control signal to the first switch; and provide the second control signal to the second switch. It can be learned that if the current output by the output terminal of the UPS is a minimum value of the currents output by the output terminals of all the UPSs, or a current output by the bypass switch module is a minimum value of the currents output by the bypass switch modules of all the UPSs, a control mode in which the control module controls the bypass switch module in the current equalization period may maintain a control mode in which the control module controls the bypass switch module in the collection period. Other UPSs in the power supply system change a current output to the load.

In a possible design, the current equalization period includes the plurality of alternating current cycles. When the control module reduces, in the current equalization period based on the duration of the current equalization period, the duration in which the bypass switch module connects the power grid to the load, the control module is configured to provide, based on a third conduction angle, a third control signal to the first switch, where the third conduction angle is less than the first conduction angle, and the third conduction angle is an electrical angle between a start moment at which a level of the third control signal in the positive half cycle is the first level and the end moment of the positive half cycle; and the third control signal is used to drive, in a period corresponding to the third conduction angle in each positive half cycle, the first switch to connect the power grid to the load, and drive, in each negative half cycle, the first switch to be in the off state; or provide, based on a fourth conduction angle, a fourth control signal to the second switch, where the fourth conduction angle is less than the second conduction angle, and the fourth conduction angle is an electrical angle between a start moment at which a level of the fourth control signal in the negative half cycle is the first level and the end moment of the negative half cycle; and the fourth control signal is used to drive, in a period corresponding to the fourth conduction angle in each negative half cycle, the second switch to connect the power grid to the load, and drive, in each positive half cycle, the second switch to be in the off state; and provide the third control signal to the first switch, and provide the fourth control signal to the second switch.

In this embodiment, the control module may reduce the conduction angle based on the first conduction angle, generate the third control signal by using the reduced conduction angle, and control the first switch. Therefore, a conduction moment of the first switch at the positive half cycle of each alternating current may be delayed. In an example, the output current may be decreased by reducing the conduction duration. Similarly, the control module may reduce the conduction angle based on the second conduction angle, generate the fourth control signal by using the reduced conduction angle, and control the second switch. Therefore, a conduction moment of the second switch at each negative half cycle of the alternating current may be delayed. In an example, the output current may be decreased by reducing the conduction duration. The control module may change, by adjusting a conduction angle of a control signal of the first switch or the second switch, a current output by the bypass switch module to the load. It can be learned that the UPS in the power supply system may perform the current equalization adjustment without an additional component.

In a possible design, the bypass switch module includes a first switch and a second switch. One terminal of the first switch is connected to the input terminal, and the other terminal is connected to the output terminal. The second switch is connected in parallel to the first switch, and the control module is separately connected to control terminals of the first switch and the second switch. A current transmission direction when the first switch is turned on is opposite to a current transmission direction when the second switch is turned on. The collection period includes a plurality of alternating current cycles. Each alternating current cycle includes a positive half cycle and a negative half cycle. The control module is further configured to, in the collection period, adjust, by providing a fifth control signal to the first switch, an on/off state of the first switch, to enable the first switch to connect the power grid to the load in positive half cycles of all the alternating currents, and enable the first switch to be in the off state in each negative half cycle of each alternating current; or adjust, by inputting a sixth control signal to the second switch, an on/off state of the second switch, to enable the second switch to connect the power grid to the load in all the negative half cycles, and enable the second switch to be in the off state in each positive half cycle.

In this embodiment, in the collection period, the control module controls the first switch to transmit, in all positive half cycles of the alternating current, electric energy provided by the power grid to the output terminal, controls, in each negative half cycle of the alternating current, the first switch to be in the off state; and controls the second switch to transmit, in all negative half cycles of the alternating current, the electric energy provided by the power grid to the output terminal, and controls, in each negative half cycle of the alternating current, the second switch to be in the off state in each positive half cycle. This design ensures that a waveform of the current output by the bypass switch control module is a sine wave in the collection period.

In a possible design, the current equalization period includes a plurality of alternating current cycles. When the control module controls, in the current equalization period, the duration in which the bypass switch module connects the power grid to the load to be equal to the duration of the current equalization period, the control module is configured to provide the fifth control signal to the first switch; and provide the sixth control signal to the second switch. It can be learned that if the current output by the output terminal of the UPS is a minimum value of the currents output by the output terminals of all the UPSs, or the current output by the bypass switch module is a minimum value of the currents output by the bypass switch modules of all the UPSs, the control mode in which the control module controls the bypass switch module in the current equalization period may maintain the control mode in which the control module controls the bypass switch module in the collection period. Other UPSs in the power supply system change the current output to the load.

In a possible design, the current equalization period includes the plurality of alternating current cycles. When the control module reduces, in the current equalization period based on the duration of the current equalization period, the duration in which the bypass switch module connects the power grid to the load, the control module is configured to adjust, by providing a seventh control signal to the first switch, the on/off state of the first switch, to enable the first switch to transmit, in a part of the positive half cycles of the alternating currents, electric energy provided by the power grid to the output terminal, and enable the first switch to be in the off state in each negative half cycle of the alternating current; or adjust, by providing an eighth control signal to the second switch, the on/off state of the second switch, to enable the second switch to transmit, in a part of the negative half cycles, electric energy provided by the power grid to the output terminal, and enable the second switch to be in the off state in each positive half cycle.

In this embodiment, the control module may control, in all or a part of alternating current cycles in the current equalization period, the first switch to be in the on state in the positive half cycle and to be in the off state in the negative half cycle, and control the second switch to be in the off state in the positive half cycle and to be in the on state in the negative half cycle. This may enable the bypass switch module to output a current to the load in this part of alternating current cycles. In the other part of the alternating current cycles, the first switch and the second switch are in the off state. This decreases the current output by the bypass switch module in the current equalization period. It can be learned that the UPS in the power supply system may perform the current equalization adjustment without an additional component.

According to a second aspect, this application provides a power supply method. The method is applied to an uninterruptible power supply UPS in a power supply system. The power supply system includes a plurality of uninterruptible power supplies UPSs. Each UPS in the plurality of UPSs includes at least an input terminal, a control module, a bypass switch module, a direct current to alternating current conversion module, a collection module, and an output terminal. An input terminal of each UPS is connected to a power grid by using a first node, an output terminal of each UPS is connected to a load by using a second node, and the power grid is configured to provide an alternating current to each UPS. One terminal of the bypass switch module is connected to the input terminal, and the other terminal of the bypass switch module is connected to the output terminal. The bypass switch module is configured to connect the power grid to the load under control of the control module. The collection module is connected to a collection point, and configured to collect a current at the collection point under the control of the control module. The collection point is disposed between the first node and the second node. The direct current to alternating current conversion module is connected to the output terminal, and configured to output a current to the output terminal. The method includes controlling, in a collection period in a first duration, the collection module to collect a first current at the collection point, and determining a harmonic component and/or a reactive current component of the first current; and controlling, in a current equalization period in the first duration, the direct current to alternating current conversion module to output a first compensation current, where the first compensation current includes a first compensation reactive current component and/or a first quantity of first compensation harmonic components, where the first quantity is less than or equal to a quantity of harmonic components of the first current, one first compensation reactive current component in the first quantity of first compensation harmonic components and one harmonic component of the first current have a same frequency and opposite amplitudes, and the first compensation reactive current component and the reactive current component have a same frequency and opposite amplitudes; and adjusting a duration in which the bypass switch module connects the power grid to the load, to balance currents output by output terminals of different UPSs in the plurality of UPSs, or balance currents output by bypass switch modules of the different UPSs, where the current equalization period does not completely overlap the collection period.

In a possible design, before the controlling the direct current to alternating current conversion module to output a first compensation current, the method further includes controlling, in the collection period based on a predetermined harmonic component and/or reactive current component, the direct current to alternating current conversion module to output a second compensation current, where the second compensation current includes a second compensation reactive current component and/or a second quantity of second compensation harmonic components, where the second quantity is less than or equal to a quantity of predetermined harmonic components, and one second compensation reactive current component in the second quantity of second compensation harmonic components and one harmonic component of the predetermined harmonic components have a same frequency and opposite amplitudes; the second compensation reactive current component and the predetermined reactive current component have a same frequency and opposite amplitudes; the predetermined harmonic component and/or reactive current component are/is determined based on a current at the collection point in a collection period in a second duration, and an end moment of the second duration is a start moment of the first duration.

In a possible design, the adjusting a duration in which the bypass switch module connects the power grid to the load includes adjusting, based on currents output by output terminals of all UPSs and a second current output by the output terminals of the UPSs, the duration in which the bypass switch module connects the power grid to the load; or adjusting, based on currents output by bypass switch modules of all the UPSs and a third current output by the bypass switch modules, the duration in which the bypass switch module connects the power grid to the load.

In a possible design, the adjusting, based on currents output by output terminals of all the UPSs and a second current output by the output terminals of the UPSs, the duration in which the bypass switch module connects the power grid to the load includes, if the second current is a minimum value of the currents output by the output terminals of all the UPSs, controlling the duration in which the bypass switch module connects the power grid to the load to be equal to a duration of the current equalization period; or if the second current is greater than the minimum value, reducing, based on a duration of the current equalization period, the duration in which the bypass switch module connects the power grid to the load.

In a possible design, the adjusting, based on currents output by bypass switch modules of all the UPSs and a third current output by the bypass switch modules, the duration in which the bypass switch module connects the power grid to the load includes, if the third current is a minimum value of the currents output by the bypass switch modules of all the UPSs, controlling the duration in which the bypass switch module connects the power grid to the load to be equal to a duration of the current equalization period; or if the third current is greater than the minimum value, reducing, based on a duration of the current equalization period, the duration in which the bypass switch module connects the power grid to the load.

In a possible design, the bypass switch module includes a first switch and a second switch. One terminal of the first switch is connected to the input terminal, and the other terminal is connected to the output terminal. The second switch is connected in parallel to the first switch. A current transmission direction when the first switch is turned on is opposite to a current transmission direction when the second switch is turned on. The collection period induces a plurality of alternating current cycles. Each alternating current cycle includes a positive half cycle and a negative half cycle. The alternating current cycle includes a positive half cycle and a negative half cycle. The method further includes providing, in the collection period based on a preset first conduction angle, a first control signal to the first switch, where the first conduction angle is an electrical angle between a start moment at which a level of the first control signal in the positive half cycle is a first level and an end moment of the positive half cycle; the first level is a level that is used to drive the first switch to be in an on state; the first control signal is used to drive, in a period corresponding to the first conduction angle in each positive half cycle, the first switch to connect the power grid to the load, and drive, in each negative half cycle, the first switch to be in an off state; or providing, based on a preset second conduction angle, a second control signal to the second switch, where the second conduction angle is an electrical angle between a start moment at which a level of the second control signal in the negative half cycle is a first level and an end moment of the negative half cycle; the first level is a level used to drive the second switch to be in an on state; and the second control signal is used to drive, in a period corresponding to the second conduction angle in each negative half cycle, the second switch to connect the power grid to the load, and drive, in each positive half cycle, the second switch to be in an off state.

In a possible design, the first conduction angle is equal to an electrical angle of the positive half cycle, and the second conduction angle is equal to an electrical angle of the negative half cycle.

In a possible design, the current equalization period includes the plurality of alternating current cycles, and the controlling, in the current equalization period, the duration in which the bypass switch module connects the power grid to the load to be equal to a duration of the current equalization period includes providing the first control signal to the first switch; and providing the second control signal to the second switch.

In a possible design, the current equalization period includes the plurality of alternating current cycles, and the reducing, based on a duration of the current equalization period, the duration in which the bypass switch module connects the power grid to the load includes providing, based on a third conduction angle, a third control signal to the first switch, where the third conduction angle is less than the first conduction angle, and the third conduction angle is an electrical angle between a start moment at which a level of the third control signal in the positive half cycle is the first level and the end moment of the positive half cycle; and the third control signal is used to drive, in a period corresponding to the third conduction angle in each positive half cycle, the first switch to connect the power grid to the load, and drive, in each negative half cycle, the first switch to be in the off state; or providing, based on a fourth conduction angle, a fourth control signal to the second switch, where the fourth conduction angle is less than the second conduction angle, and the fourth conduction angle is an electrical angle between a start moment at which a level of the fourth control signal in the negative half cycle is the first level and the end moment of the negative half cycle; and the fourth control signal is used to drive, in a period corresponding to the fourth conduction angle in each negative half cycle, the second switch to connect the power grid to the load, and drive, in each positive half cycle, the second switch to be in the off state; and providing the third control signal to the first switch, and provide the fourth control signal to the second switch.

In a possible design, the bypass switch module includes a first switch and a second switch. One terminal of the first switch is connected to the input terminal, and the other terminal is connected to the output terminal. The second switch is connected in parallel to the first switch. The control module is separately connected to control terminals of the first switch and the second switch. A current transmission direction when the first switch is turned on is opposite to a current transmission direction when the second switch is turned on. The collection period includes a plurality of alternating current cycles. Each alternating current cycle includes a positive half cycle and a negative half cycle. The method further includes, in the collection period, adjusting, by providing a fifth control signal to the control terminal of the first switch, an on/off state of the first switch, to enable the first switch to connect the power grid to the load in positive half cycles of all the alternating currents, and enable the first switch to be in the off state in each negative half cycle of each alternating current; or adjusting, by inputting a sixth control signal to the control terminal of the second switch, an on/off state of the second switch, to enable the second switch to connect the power grid to the load in all the negative half cycles, and enable the second switch to be in the off state in each positive half cycle.

In a possible design, the current equalization period includes the plurality of alternating current cycles, and the controlling, in the current equalization period, the duration in which the bypass switch module connects the power grid to the load to be equal to a duration of the current equalization period includes providing, by the control module, the fifth control signal to the first switch; and providing, by the control module, the sixth control signal to the second switch.

In a possible design, the current equalization period includes the plurality of alternating current cycles, and the reducing, based on a duration of the current equalization period, the duration in which the bypass switch module connects the power grid to the load includes adjusting, by providing a seventh control signal to the first switch, an on/off state of the first switch, to enable the first switch to connect the power grid to the load in a part of the positive half cycles of the alternating currents, and enable the first switch to be in the off state in each negative half cycle of each alternating current; or adjusting, by the control module, by providing an eighth control signal to the second switch, an on/off state of the second switch, to enable the second switch to connect the power grid to the load in a part of the negative half cycle, and enable the second switch to be in the off state in each positive half cycle.

According to a third aspect, this application provides a control apparatus. The control apparatus is applied to an uninterruptible power supply UPS. The UPS includes at least an input terminal, a control module, a bypass switch module, a direct current to alternating current conversion module, a collection module, and an output terminal. An input terminal of each UPS is connected to a power grid by using a first node, an output terminal of each UPS is connected to a load by using a second node, and the power grid is configured to provide an alternating current to each UPS. One terminal of the bypass switch module is connected to the input terminal, and the other terminal of the bypass switch module is connected to the output terminal. The bypass switch module is configured to connect the power grid to the load under control of the control module. The collection module is connected to a collection point, and configured to collect a current at the collection point under the control of the control module. The collection point is disposed between the first node and the second node. The direct current to alternating current conversion module is connected to the output terminal, and configured to output a current to the output terminal. The control apparatus is connected to the bypass switch module, the collection module, and the direct current to alternating current conversion module, and is configured to perform the method in any design of the second aspect.

According to a fourth aspect, this application provides a computer-readable storage medium. The computer-readable storage medium stores computer instructions. When the computer instructions in the computer-readable storage medium are executed by a control apparatus, the control apparatus is enabled to perform the method in any design of the second aspect.

According to a fifth aspect, this application provides a computer program product. The storage medium stores computer instructions. When the computer instructions are executed by a control apparatus, the control apparatus is enabled to perform the method in any design of the second aspect.

For technical effects that can be achieved in the second aspect to the fifth aspect, refer to the technical effects that can be achieved in the possible designs of the first aspect. Details are not described herein again.

DESCRIPTION OF EMBODIMENTS

Figure 1:
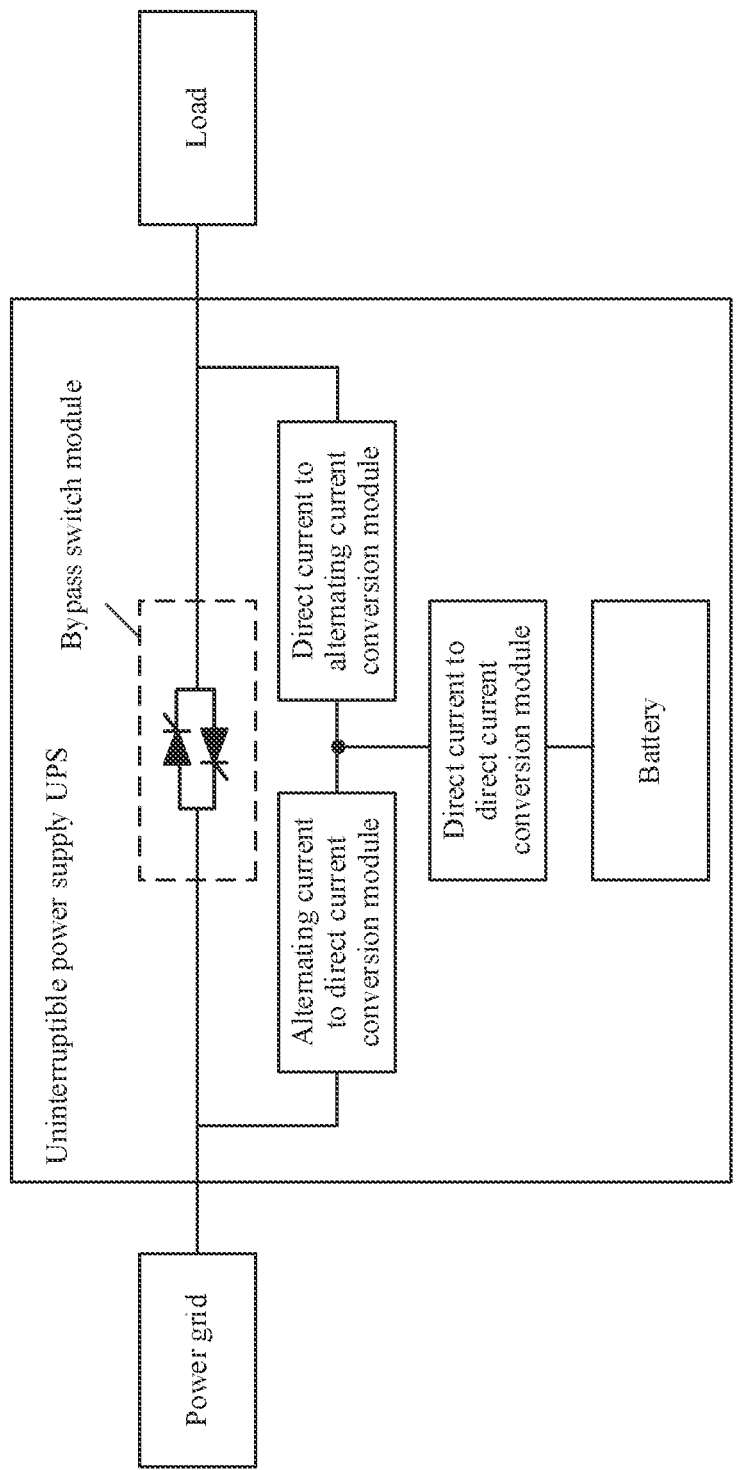
FIG. 1 is a schematic diagram of a structure of a UPS.

At present, to stably provide power for a load, an uninterruptible power supply emerges. Referring to FIG. 1, generally, the UPS may include a bypass switch module and a direct current to alternating current conversion module, or may include an alternating current to direct current conversion module, a direct current to direct current conversion module, and a battery. When a power grid side (such as mains) is normal, the UPS may obtain electric energy from the power grid side. After the electric energy is processed by the alternating current to direct current conversion module and the direct current to direct current conversion module, a part of the processed electric energy may be provided to the load, and the other part of the processed electric energy may be stored in the battery. When the mains is abnormal, the UPS provides power to the load. For example, electric energy stored in the battery in the UPS may be provided to the load after being processed by the direct current to direct current conversion module and the direct current to alternating current conversion module.

Figure 2A:
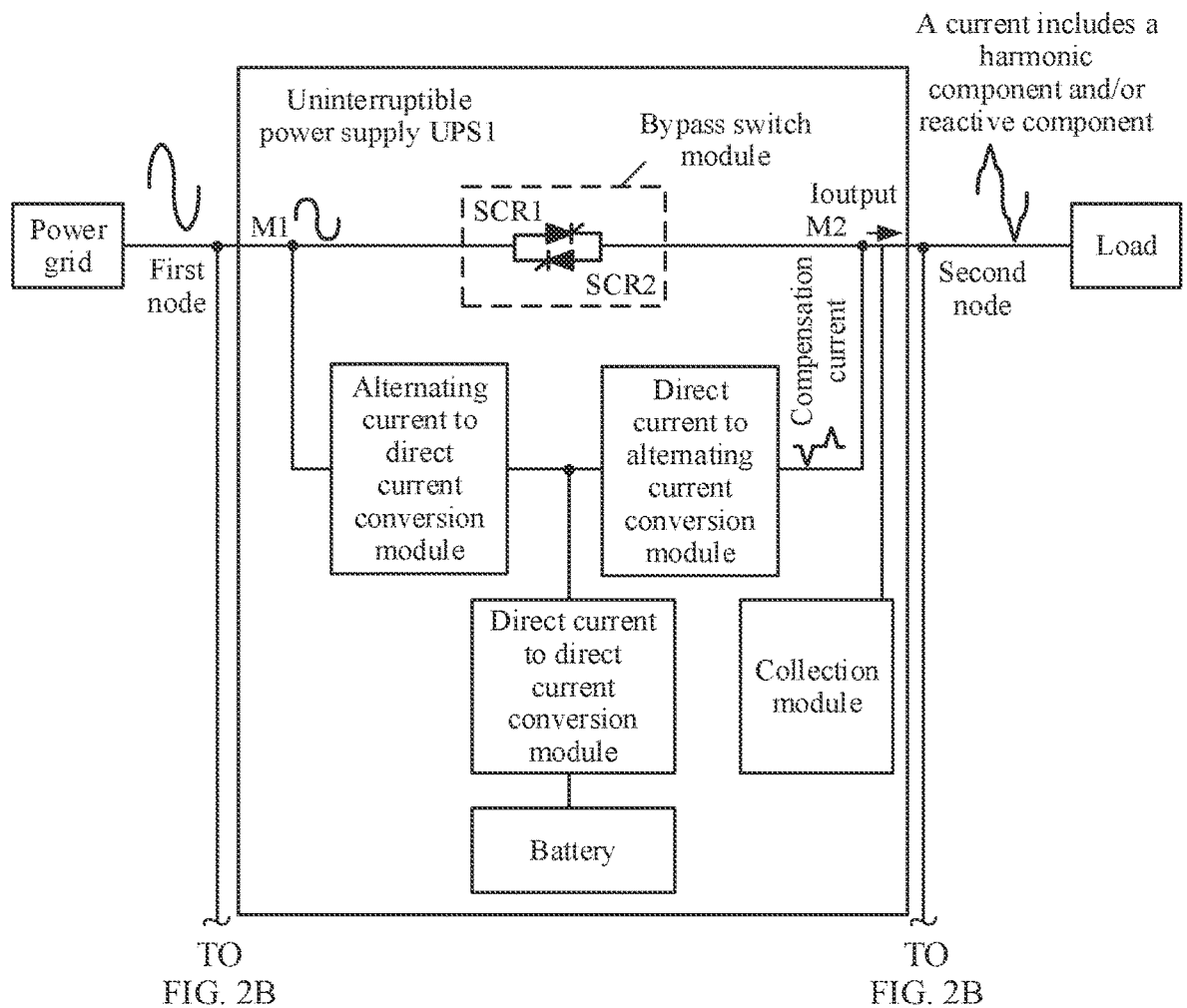
FIG. 2A, FIG. 2B, and FIG. 2C are schematic diagrams of a structure of a power supply system.
Figure 2B:
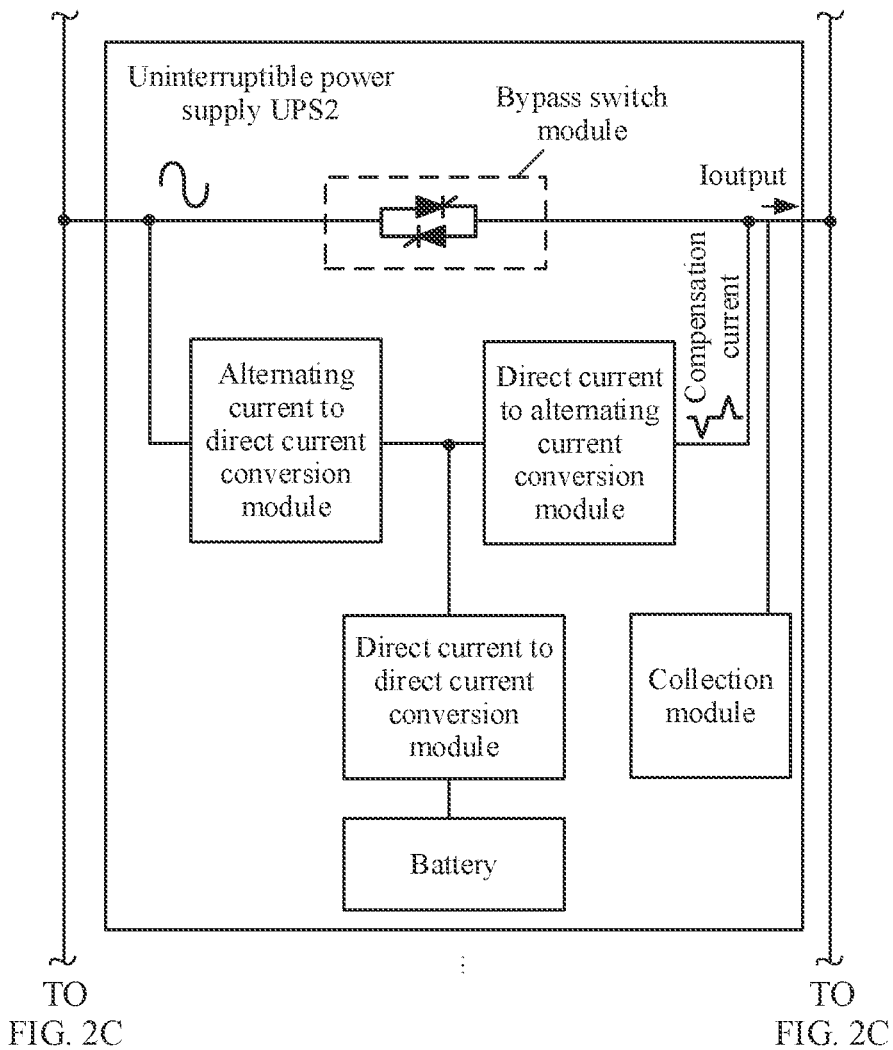
Figure 2C:
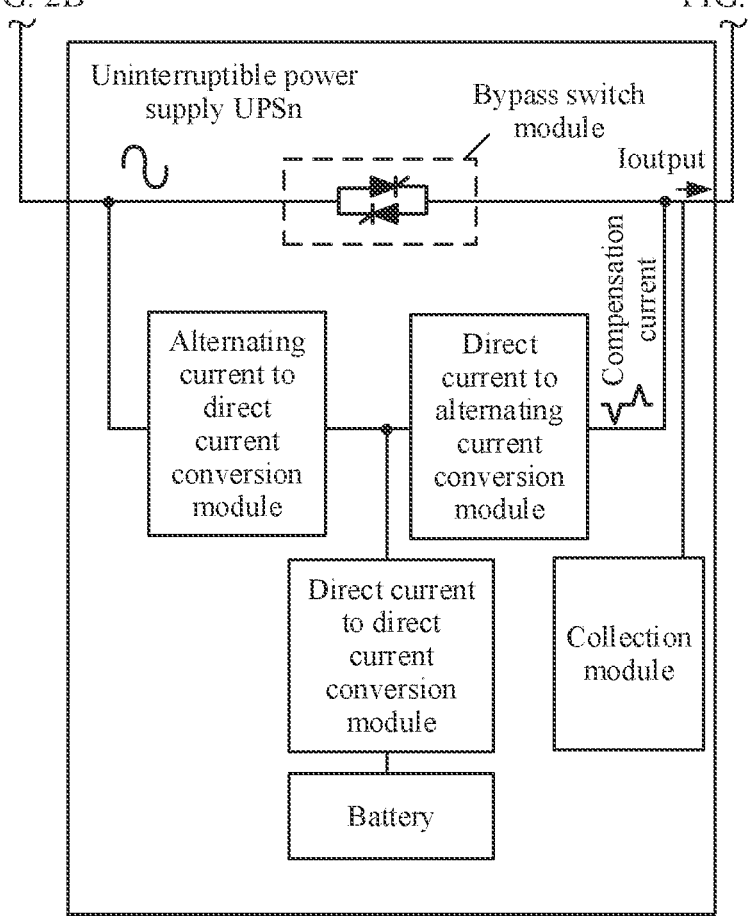

A power supply system that provides power to the load may include a plurality of parallelly-connected UPSs. With the improvement of reliability of the power grid, the UPSs can run in ECO mode, and a large harmonic current or reactive current may be injected into the power grid at the load. As a result, the power grid may be polluted. Referring to FIG. 2A, FIG. 2B, and FIG. 2C, each UPS in the power supply system may compensate a current harmonic or a reactive current in the power grid by using the direct current to alternating current conversion module, to minimize pollution to the power grid.

Figure 3A:
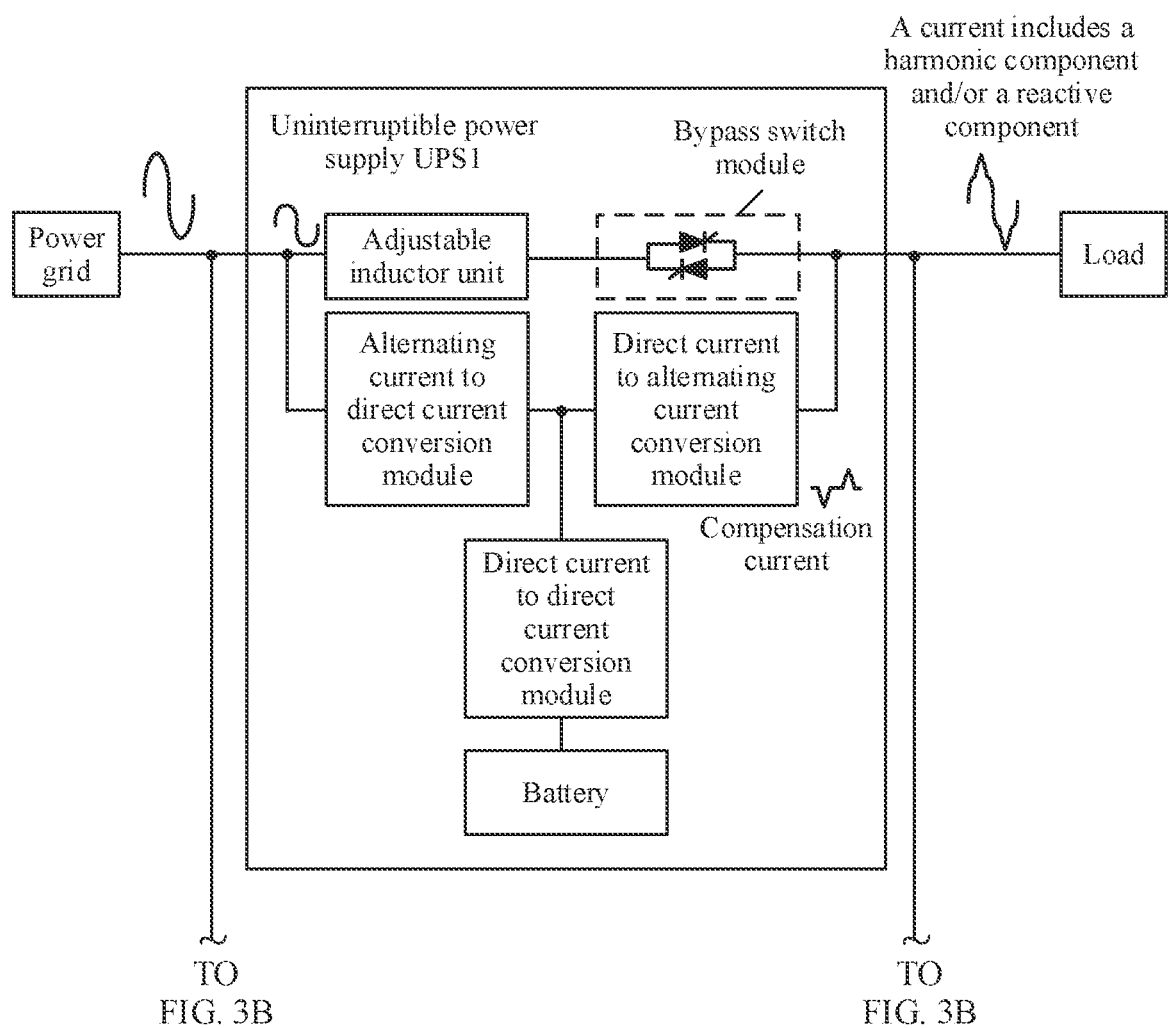
FIG. 3A, FIG. 3B, and FIG. 3C are schematic diagrams of a structure of a power supply system including an adjustable inductor unit.
Figure 3B:
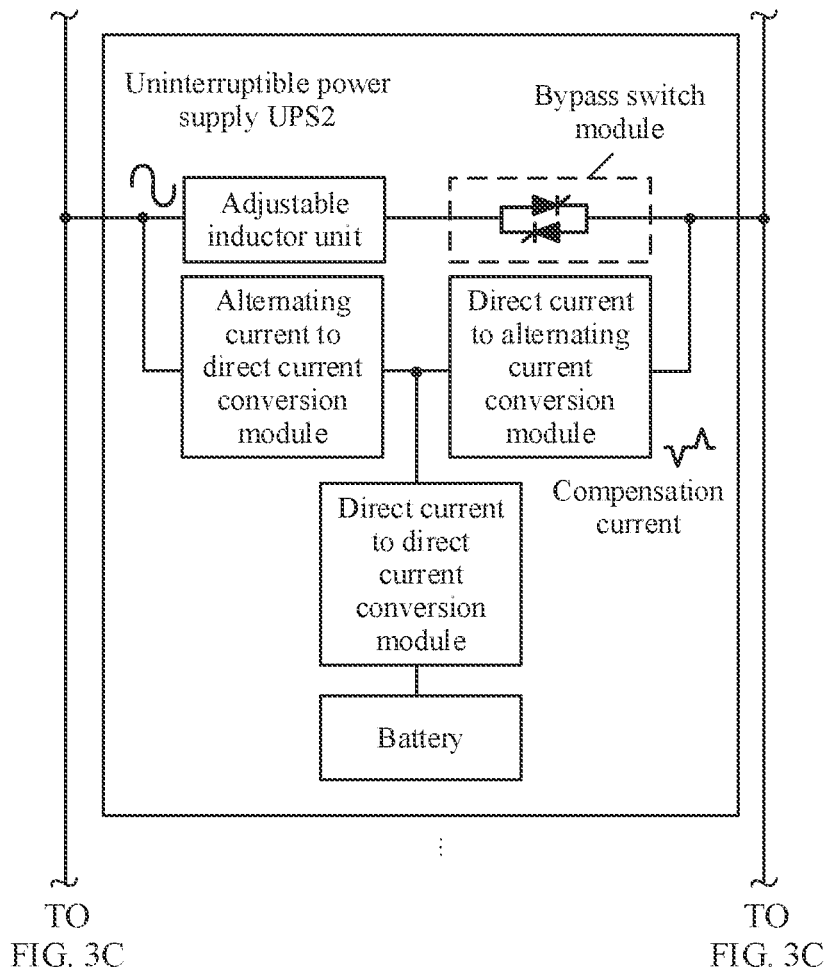
Figure 3C:
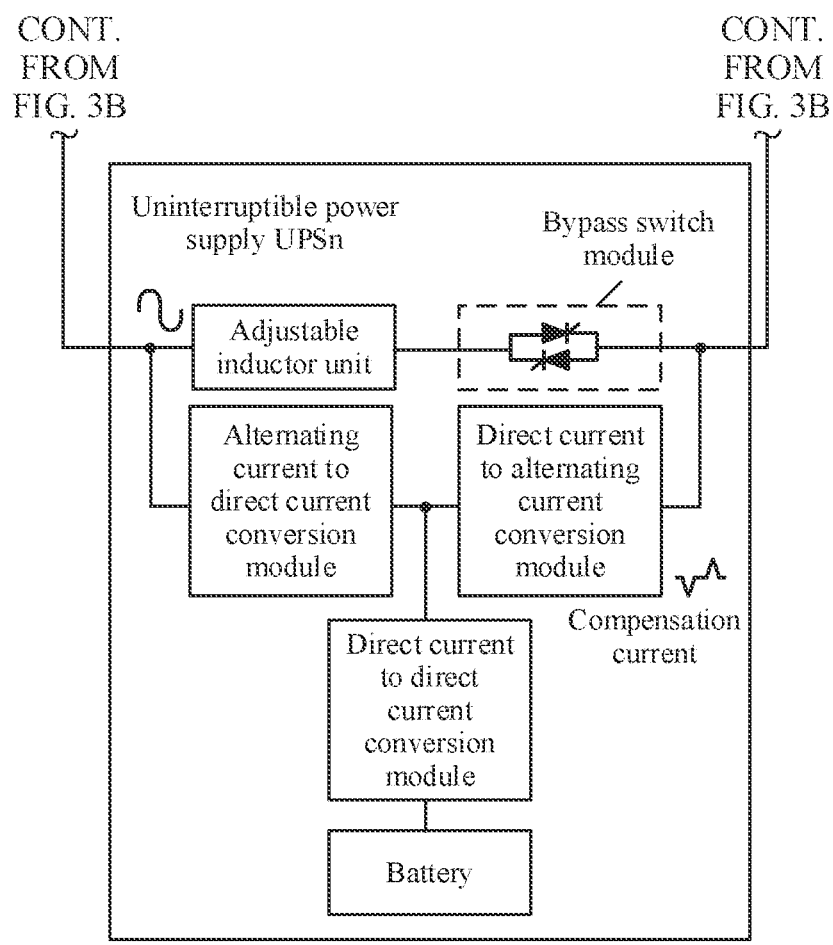

In a process of providing the power to the load, more equalized currents output by the plurality of UPSs to the load indicates higher reliability of the power supply system and a stronger loading capability. Therefore, current equalization control is usually performed on the plurality of parallelly-connected UPSs in the power supply system. To implement the current equalization control on the plurality of UPSs, refer to FIG. 3A, FIG. 3B, and FIG. 3C. An adjustable inductor unit or an adjustable resistor unit connected in series to the bypass switch module may be added to each UPS. Because a sum of impedance of the bypass switch module and impedance of a cable is greatly different from that of an inductor in the adjustable inductor unit (or a resistor in the adjustable resistor unit), impedance in a circuit that provides the power to the load by using the bypass switch module is mainly determined by a quantity of connected inductors (or resistors). A current output by each UPS can be equalized by controlling a quantity of inductors in the adjustable inductor unit (or a quantity of resistors in the adjustable resistor unit) in each UPS. In this design, because the adjustable inductor unit or the adjustable resistor unit is added to each UPS, costs and occupied space are increased. During current equalization, the inductor or resistor may heat up. This causes extra energy loss and affects efficiency of the power supply system. In a current equalization adjustment process, the current output by each UPS to the load may include a current harmonic or a reactive current. As a result, when each UPS compensates the current harmonic or the reactive current in the power grid by using the direct current to alternating current conversion module, the pollution to the power grid is not significantly improved.

In view of this, this application provides a power supply system that has high power supply efficiency, a high loading capability, and a good capability of minimizing the pollution to the power grid without requiring another component. A plurality of uninterruptible power supplies UPSs in the power supply system are connected in parallel. Each UPS in the ECO mode provides an equalized load current to the load, and compensates a harmonic current and/or a reactive current of the load. For example, power is provided to the load in a collection period and a current equalization period in a first duration by using a bypass. Each UPS collects, in the collection period, information about a harmonic component and/or a reactive current component in an output current. The information is used as a reference value for compensating the harmonic current and/or the reactive current of the load. Bypass currents of each UPS may be adjusted in the current equalization period, so that an average value of the bypass currents of the UPSs in the first duration are basically the same.

To make the objective, features, and merits of the present disclosure more obvious and comprehensible, technical terms and concepts in this application are described first, to help understand the technical solutions described in embodiments of the present disclosure.

1. Active power and reactive power: In a scenario in which a power supply system provides an alternating current to a load, total power includes active power and reactive power. The active power may refer to electric power required when a load is running, for example, a load converts electric energy into electric power in forms of heat energy, mechanical energy, or the like. Generally, it can be understood as electric power consumed by the load. The reactive power may refer to power consumed by a component such as a capacitor or an inductor, and may be generally understood as electric power consumed by a non-load component, for example, electric power consumed by the power supply system, or electric power consumed when an inductor element converts the electric energy into magnetic field energy.

2. Current harmonic: In a scenario in which a power supply system provides an alternating current to a load, a waveform of a current or voltage in a cable in an ideal state is a sine periodic wave, and the voltage or current may be referred to as a fundamental voltage or fundamental current. However, due to factors such as connection to a load, the waveform of the current or voltage in the cable may be distorted. In this case, the waveform of the current or the voltage in the cable is a non-sine periodic wave, and a Fourier series expansion form of the current or voltage in the cable may include a sine periodic wave (that is, a fundamental wave) and one or more harmonics in the ideal state, a waveform of each harmonic is also a sine periodic wave, and frequency is an integer multiple of the fundamental frequency.

A fundamental wave in the non-sine periodic wave may be referred to as a fundamental component in the current, a fundamental current, a current fundamental wave, or the like. A harmonic may be referred to as a harmonic component of the current, a harmonic current, a current harmonic, or the like. A fundamental wave in a non-sine periodic voltage may be referred to as a fundamental component in the voltage, a fundamental voltage, a voltage fundamental wave, or the like. A harmonic may be referred to as a harmonic component, a harmonic voltage, a voltage harmonic, or the like in the voltage.

3. Active current and reactive current: In a scenario in which a power supply system provides an alternating current to a load, a fundamental current in a cable includes an active current component and a reactive current component. The active current component may refer to a current generated when a load is running, and the reactive current may refer to a current generated when power is consumed by a non-load component.

Figure 4:
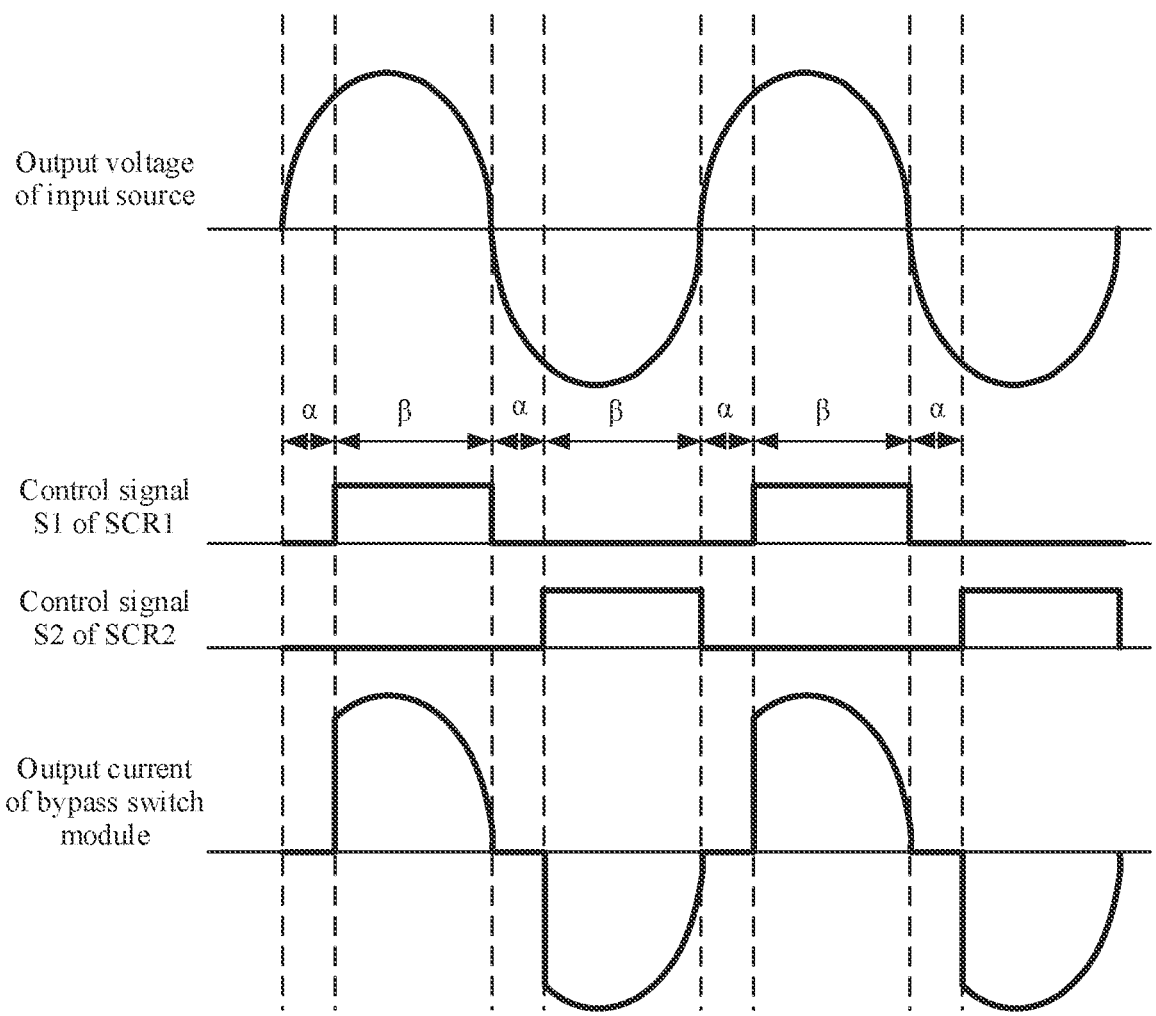
FIG. 4 is a schematic diagram of a conduction angle and a control angle.

4. Control angle and conduction angle of switch: A bypass switch module in a UPS may include a static bypass switch (STS). The STS usually uses a silicon-controlled rectifier (SCR) as the switch. A current level of the SCR can match a power level of the UPS. The SCR can also be referred to as a thyristor, and is a semi-controlled device. A waveform of an output voltage can be changed by controlling conduction time of the SCR. Referring to FIG. 4, an input source, a bypass switch module, and a load form a circuit. The bypass switch module may include a switch SCR1 and a switch SCR2. A voltage signal output by the input source is a sine periodic wave. In a positive half cycle, if the SCR1 is in an on state and the SCR2 is in an off state, a current in the circuit flows to the load through the SCR1. In a negative half cycle, if the SCR2 is in the on state and the SCR1 is in the off state, the current in the circuit flows to the input source through the SCR2.

Generally, the SCR may be driven in the on state or the off state by providing a control signal to the SCR. When a current of a control signal provided to the SCR is less than a latching current (that is, a minimum current required for maintaining the SCR to be in the on state), the SCR may be in the off state. When the current of the control signal provided to the SCR is greater than or equal to the latching current, the SCR may be in the on state. It can be learned that, the SCR may be adjusted, by adjusting the control signal of the SCR, to be in the on state or the off state. Generally, a cycle of an alternating current signal includes a positive half cycle and a negative half cycle. Electrical angles of both the positive half cycle and the negative half cycle are 180°. It is assumed that a voltage of a control signal that may drive the SCR to be in the on state is denoted as Vk. An electrical angle between a start moment of the positive half cycle (or the negative half cycle) and a moment at which the voltage of the control signal of the SCR is increased to Vk may be referred to as a trigger angle or a control angle α, an electrical angle between a moment at which the voltage of the control signal of the SCR reaches Vk and an end moment of the positive half cycle (or the negative half cycle) may be referred to as a conduction angle β.

Generally, a sum of the control angle α and the conduction angle α of the control signal of the SCR is 180°. Therefore, a conduction moment of the SCR in the positive half cycle (or the negative half cycle) may be adjusted by adjusting the control angle α or the conduction angle β of the SCR. In the positive half cycle, if a conduction angle of a control signal of the SCR1 is β1, the SCR1 may be driven to be in the on state in a period corresponding to β1. In the negative half cycle, if the conduction angle of the control signal of the SCR1 is 0, the SCR1 may be driven to be in the off state in the negative half cycle. Similarly, in the positive half cycle, if a conduction angle of a control signal of the SCR2 is 0, the SCR2 may be driven to be in the off state in the positive half cycle. In the negative half cycle, if the conduction angle of the control signal of the SCR2 is β2, the SCR2 may be driven to be in the on state in a period corresponding to β2. It can be learned that an output current of the bypass switch module can be adjusted by adjusting the conduction angle of the SCR1 and the conduction angle of the SCR2.

The following clearly and completely describes the technical solutions in embodiments of the present disclosure with reference to the accompanying drawings in embodiments of the present disclosure. It is clear that the described embodiments are merely a part rather than all of embodiments of the present disclosure. All other embodiments obtained by a person of ordinary skill in the art based on the embodiments of the present disclosure without creative efforts shall fall within the protection scope of the present disclosure.

As shown in FIG. 2A, FIG. 2B, and FIG. 2C, a power supply system provided in an embodiment of this application may include a plurality of UPSs. An input terminal M1 of each UPS (for example, UPS1, UPS2, UPSn) is connected to the power grid by using a first node. In an example, an input terminal of each UPS is connected to the first node, and the first node is connected to the power grid. An output terminal M2 of each UPS (for example, UPS1, UPS2, UPSn) is connected to the load by using a second node. In an example, an output terminal of each UPS is connected to the second node, and the second node is connected to the power grid. It can be learned that the first node and the second node are common terminals of a plurality of parallelly-connected UPSs.

Each UPS may include a bypass switch module, a direct current to alternating current conversion module, and a collection module. Each UPS may also include an alternating current to direct current conversion module, a direct current to direct current conversion module, a battery, and a control module. The bypass switch module is connected between the input terminal M1 and the output terminal M2 of the UPS. One terminal of the alternating current to direct current conversion module is connected to the input terminal M1, and the other end is separately connected to the direct current to alternating current conversion module and the direct current to direct current conversion module. It can be seen that a branch formed by serially connecting the alternating current to direct current conversion module and the direct current to alternating current conversion module is connected in parallel to the bypass switch module.

The bypass switch module may receive an alternating current flowing into the bypass switch module through the input terminal M1, and output the alternating current to the output terminal M2. The control module may control the bypass switch module, to adjust a voltage or a current of electric energy output by the bypass switch module. As shown in FIG. 2A, FIG. 2B, and FIG. 2C, the bypass switch module may include a switch SCR1 and a switch SCR2. A current transmission direction when the switch SCR1 is in the on state is opposite to a current transmission direction when the switch SCR2 is in the on state. The switch SCR1 may be configured to connect the input terminal M1 to the output terminal M2 in the positive half cycle, to connect the power grid to the load. The switch SCR2 may be configured to connect the input terminal M1 to the output terminal M2 in the negative half cycle, to connect the power grid to the load.

The control module may be connected to control terminals of the switch SCR1 and the switch SC2, and may apply the control signal to the switch SCR1, to drive the switch SCR1 to be in the on or off state. Alternatively, the control module may apply the control signal to the switch SCR2, to drive the switch SCR2 to be in the on or off state. The control module may adjust the conduction angle of the control signal provided to the switch SCR1 and/or the switch SCR2, to change a conduction moment of the switch SCR1 and/or the switch SCR2, and change a current output by the bypass switch module.

The alternating current to direct current conversion module converts an alternating current input by using the input terminal M1 into the direct current, and then provides the converted current to the direct current to alternating current conversion module and the direct current to direct current conversion module. The control module is connected to the alternating current to direct current conversion module, to control a working status of the alternating current to direct current conversion module. For example, the control module may control the alternating current to direct current conversion module to receive an alternating current flowing into the alternating current to direct current conversion module from the input terminal M1. The alternating current to direct current conversion module may include an alternating current to direct current conversion circuit.

One terminal of the direct current to alternating current conversion module is separately connected to the direct current to direct current conversion module and the alternating current to direct current conversion module, and the other terminal is connected to the output terminal M2. The direct current to alternating current conversion module may receive a direct current output by the alternating current to direct current conversion module or the direct current to direct current conversion module. The direct current to alternating current conversion module may include a direct current to alternating current conversion circuit, to convert the received direct current into an alternating current, and outputs the alternating current by using the output terminal M2. In some examples, the direct current to alternating current conversion module may have a bidirectional processing capability, for example, the direct current to alternating current conversion module not only has a capability of converting a direct current into an alternating current, but also has a capability of converting an alternating current into a direct current. For example, the direct current to alternating current conversion module may obtain electric energy from the output terminal M2, and the obtained electric energy may support the direct current to alternating current conversion module to convert a direct current into an alternating current.

The control module is connected to the direct current to alternating current conversion module, to control a working state of the direct current to alternating current conversion module. For example, the control module may control the direct current to alternating current conversion module to convert a direct current into an alternating current, or convert an alternating current into a direct current, or control a current for outputting a direct current. Generally, the direct current to alternating current conversion module may include a direct current to alternating current conversion circuit, an alternating current to direct current conversion circuit, a bidirectional conversion circuit, or the like.

One terminal of the direct current to direct current conversion module is separately connected to the alternating current to direct current conversion module and the direct current to alternating current conversion module, and the other terminal is connected to the battery. The direct current to alternating current conversion module has the bidirectional processing capability. The direct current to direct current conversion module converts the direct current output by the alternating current to direct current conversion module and transmits the processed electric energy to the battery. The battery stores the electric energy. The direct current to direct current conversion module may receive a direct current output by the battery, perform voltage conversion processing on the direct current, and output the processed direct current to the direct current to alternating current conversion module or the alternating current to direct current conversion module.

The control module is connected to the direct current to alternating current conversion module, and may control a working mode of the direct current to direct current conversion module. The direct current to direct current conversion module may be controlled, by switching the working mode of the direct current to alternating current conversion module, to control the direct current to direct current conversion module to provide the electric energy to the battery or receive the electric energy provided by the battery. Generally, the direct current to direct current conversion module may include a direct current to direct current conversion circuit, for example, a transformer or a direct current to direct current converter.

The collection module is connected to a collection point, and configured to collect a current at the collection point. The collection point may be disposed between the first node and the second node, for example, an input terminal or an output terminal of a UPS to which the control module belongs, any point between the input terminal and the first node, any point between the output terminal and the second node, or any point on a branch in which the bypass switch module is disposed between the input terminal and the output terminal.

It can be learned that the control module may control the bypass switch module, the alternating current to direct current conversion module, direct current to alternating current conversion module, the direct current to direct current conversion module, and the collection module, to enable the UPS to work in different modes. The control module may determine, based on an input voltage or current on the power grid side, whether an input on the power grid side is normal.

In some possible scenarios, the control module may adjust the UPS to be in a double conversion mode. When the power grid side is normal, the control module may control the alternating current to direct current conversion module and the direct current to alternating current conversion module, to enable the alternating current to direct current conversion module to convert all alternating currents in alternating currents that are input to the UPS into direct currents, and enable the direct current to alternating current conversion module to convert all or a part of the direct currents into alternating currents, and then provide the converted current to the load. The control module may also control the direct current to direct current conversion module, to enable the direct current to direct current conversion module to perform voltage conversion processing on a part of direct currents in the direct current, transmit electric energy obtained after the voltage conversion processing to the battery, and then charge a battery in the UPS when the power grid side is normal. When the power grid side is abnormal, the control module may control the direct current to direct current conversion module and the direct current to alternating current conversion module, to enable the direct current to direct current conversion module to perform the voltage conversion processing on a direct current provided by the battery, enable the direct current to alternating current conversion module to convert the direct current obtained after the voltage conversion processing into an alternating current, and then provide the converted current to the load after the voltage is stabilized.

In some possible scenarios, the control module may adjust the UPS to be in the ECO mode. When the power grid is normal, the control module controls the bypass switch module, to provide, to the load by using the bypass switch module, all or a part of alternating currents in the alternating current that are input to the UPS. The control module may also control the alternating current to direct current conversion module and the direct current to alternating current conversion module, to enable the alternating current to direct current conversion module to convert a part of alternating current that is input to the UPS into a direct current, enable the direct current to direct current conversion module to perform the voltage conversion processing on the direct current, transmit the electric energy obtained after the voltage conversion processing the battery, and then charge the battery in the UPS when the power grid side is normal.

When the power grid side is abnormal, the control module may control the direct current to direct current conversion module and the direct current to alternating current conversion module, to enable the direct current to direct current conversion module to perform the voltage conversion processing on a direct current provided by the battery, enable the direct current to alternating current conversion module to convert the direct current obtained after the voltage conversion processing into an alternating current, and then provide the converted current to the load after the voltage is stabilized.

Figure 5:
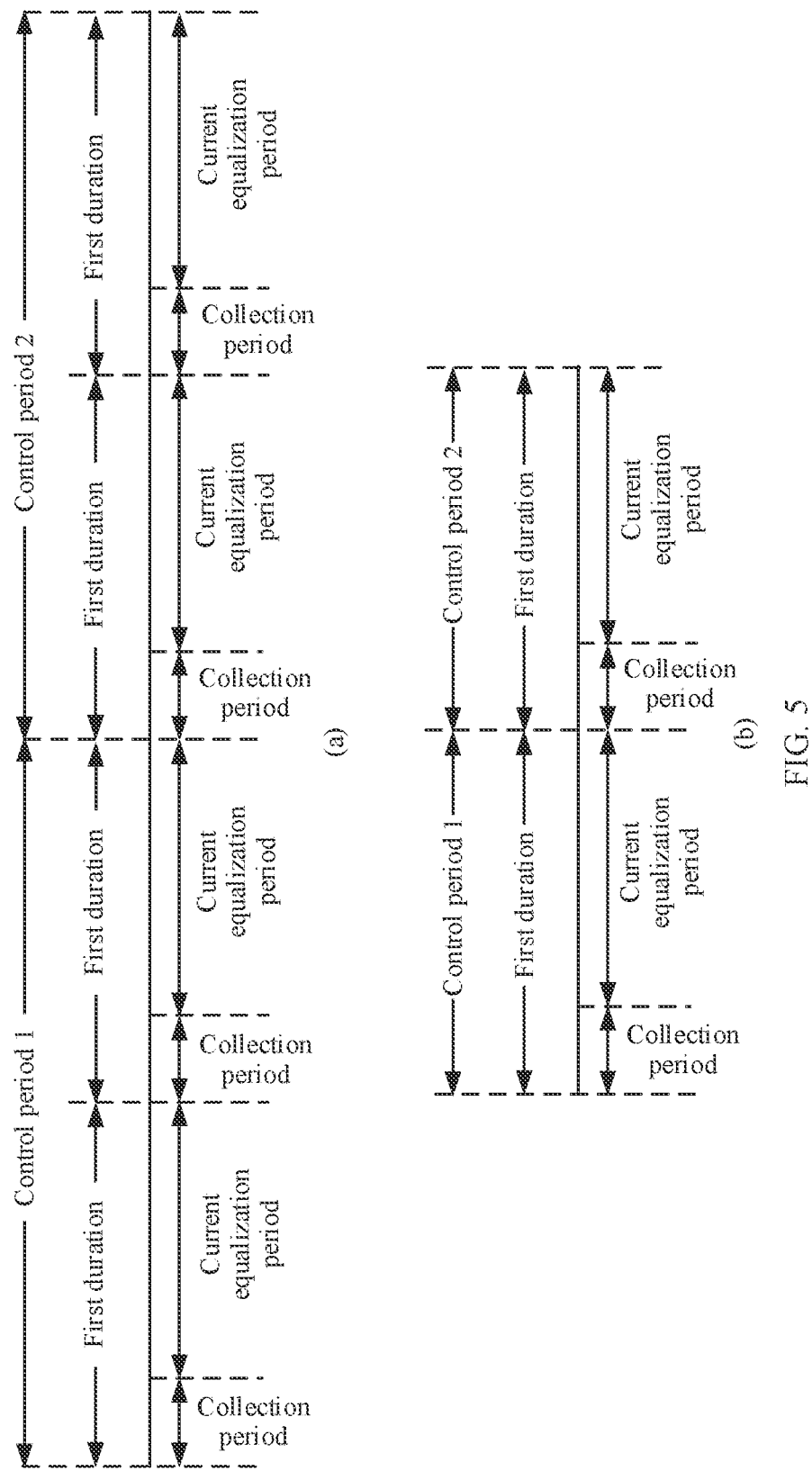
FIG. 5 is a schematic diagram of a control period and a first duration.

Each UPS in the power supply system may be in the ECO mode. A control period of each UPS may be the same. One control period may include one or more first durations, each first duration includes a collection period and a current equalization period, and the current equalization period may not completely overlap the collection period. For example, a start moment of the current equalization period may be the same as an end moment of the collection period, or a start moment of the collection period is the same as an end moment of the current equalization period, or the current equalization period does not overlap the collection period. In this design, a current collected by the collection module in the collection period can reflect a harmonic current and/or reactive current in the power grid. This facilitates the direct current to alternating current conversion module to output a compensation current, thereby improving quality of the power grid. For another example, the current equalization period and the collection period may partially overlap. In this design, a harmonic generated in a process of performing current equalization adjustment on output currents of different UPSs or output currents of bypass switch modules of different UPSs in the current equalization period has little impact on the harmonic current and/or reactive current in the power grid that is reflected by the current collected by the collection module in the collection period. For ease of description, the following uses an example in which a start moment of the current equalization period and an end moment of the collection period are a same moment. If the first duration is less than one control period, as shown in (a) in FIG. 5, one control period may include a plurality of first durations. In this case, one control period may include a plurality of collection periods and a plurality of current equalization periods, and the collection periods and the current equalization periods are alternately distributed. If the first duration is equal to one control period, as shown in (b) in FIG. 5, one control period includes one first duration. In this case, one control period includes one collection period and one current equalization period. Generally, each collection period includes a plurality of alternating current cycles, and each current equalization period includes a plurality of alternating current cycles. The current equalization period is longer than the collection period. The current equalization period is close to the first duration.

For each first duration, each UPS may output a current to the load in the collection period and the current equalization period in the first duration. The current output to the load in the current equalization period includes an equalization current and a first compensation current. The first compensation current may be used to compensate a harmonic component or reactive current component, and the harmonic component or the reactive current component is determined based on the current collected at the collection point in the collection period.

For each UPS, a first compensation current output by the direct current to alternating current conversion module of the UPS may include a first compensation reactive current component and/or a first quantity of first compensation harmonic components. The first compensation reactive current component and the reactive current component of the first current has a same frequency and opposite amplitudes. After the first compensation reactive current component is output, the first compensation reactive current component may conceal the reactive current component in the power grid, to improve the reactive current in the power grid.

The first quantity of first compensation harmonic components in the first compensation current may be used to compensate some or all harmonic components in the power grid. In other words, the first quantity of first compensation harmonic components may compensate one or more harmonic components of the first current. For example, the first current may include a plurality of harmonic components. Frequency of each harmonic component is an integer multiple of a fundamental frequency of the power grid, and quantities of times of harmonic components of the first current are different. The first quantity may be less than or equal to a quantity of harmonic components of the first current. Among the first quantity of first compensation harmonic components of the first compensation current, one first compensation reactive current component may and one harmonic component of the first current have a same frequency and opposite amplitudes.

It is assumed that harmonic components that are of the first current and that are determined by the control module are separately a harmonic component a, a harmonic component b, and a harmonic component c, the quantity of harmonic components of the first current is 3. The control module may control the direct current to alternating current conversion module to output the first compensation current. The first compensation current may include a first quantity of first harmonic components. The first quantity may be less than or equal to 3. For example, the first compensation current may include one first compensation harmonic component, denoted as a first compensation harmonic component A. The first compensation harmonic component A and the harmonic component a may have a same frequency and opposite amplitudes. That is, the first compensation harmonic component A may compensate (or conceal) the harmonic component a, to eliminate the harmonic component a in the power grid. This improves the quality of the power grid. Similarly, for another example, the first compensation current may include two first compensation harmonic components, denoted as a first compensation harmonic component A and a first compensation harmonic component B. The first compensation harmonic component A and the harmonic component a may have a same frequency and opposite amplitudes, and the first compensation harmonic component B and the harmonic component b may have a same frequency and opposite amplitudes. For another example, the first compensation current may include three first compensation harmonic components, denoted as a first compensation harmonic component A, a first compensation harmonic component B, and a first compensation harmonic component C. The first compensation harmonic component A and the harmonic component a may have a same frequency and opposite amplitudes, the first compensation harmonic component B and the harmonic component b may have a same frequency and opposite amplitudes, and the first compensation harmonic component C and the harmonic component c may have a same frequency and opposite amplitudes.

As shown in FIG. 2A, FIG. 2B, and FIG. 2C, the collection point may be disposed between the input terminal of the UPS and the first node, or disposed between the output terminal of the UPS and the second node, to collect a harmonic component or reactive current component in a current transmitted to the power grid side by using the UPS. The equalization current is determined (or adjusted) based on a current output by the output terminal M2 of each UPS or a bypass output current of each UPS. For ease of description, the following uses an example in which the collection point is disposed between the output terminal of the UPS and the second node.

For each UPS, the UPS may output a current (electric energy input by the power grid to the UPS) to the load in the collection period in the first duration, and determines, based on a current between the output terminal M2 and the second node, a harmonic component or reactive current component. For example, a current Ioutput between the output terminal M2 and the second node in FIG. 2A, FIG. 2B, and FIG. 2C is collected. Then, in the current equalization period in the first duration, the current output by the output terminal M2 to the load may include at least two parts. One part of the current is an equalization current determined based on a current between an output terminal M2 of another UPS and the second node, and the other part is a first compensation current determined based on the harmonic component or the reactive current component. The first compensation current may eliminate or reduce a harmonic component or reactive current component in a current between the output terminal M2 of the UPS and the second node. The equalization current output by each UPS may balance output currents of the UPSs in the power supply system, and therefore, power supply efficiency and a loading capability of the power supply system are improved.

The following describes capabilities or functions of the UPS with reference to a structure of the UPS. The control module may control, in the collection period, the collection module to collect the current at the collection point, that is, collect the current (may be denoted as the first current) between the output terminal M2 of the UPS and the second node. The control module determines a harmonic component or reactive current component of the first current, and controls the bypass switch module to transmit the electric energy provided by the power grid to the output terminal M2. The control module controls, in the current equalization period based on the harmonic component or the reactive current component of the first current, the direct current to alternating current conversion module to output the first compensation current, and determine, based on the current between the output terminal M2 of each UPS and the second node, whether to adjust the current output by the bypass switch module to the output terminal M2.

In the collection period, the control module may control, based on an on/off state of the switch SCR1 and the switch SCR2 in the bypass switch module, the bypass switch module to transmit the electric energy provided by the power grid to the output terminal M2, or control the bypass switch module to connect the power grid to the load. Generally, the switch SCR1 is in the off state in each negative half cycle of alternating current, and the switch SCR2 is in the off state in each positive half cycle of alternating current.

Figure 6:
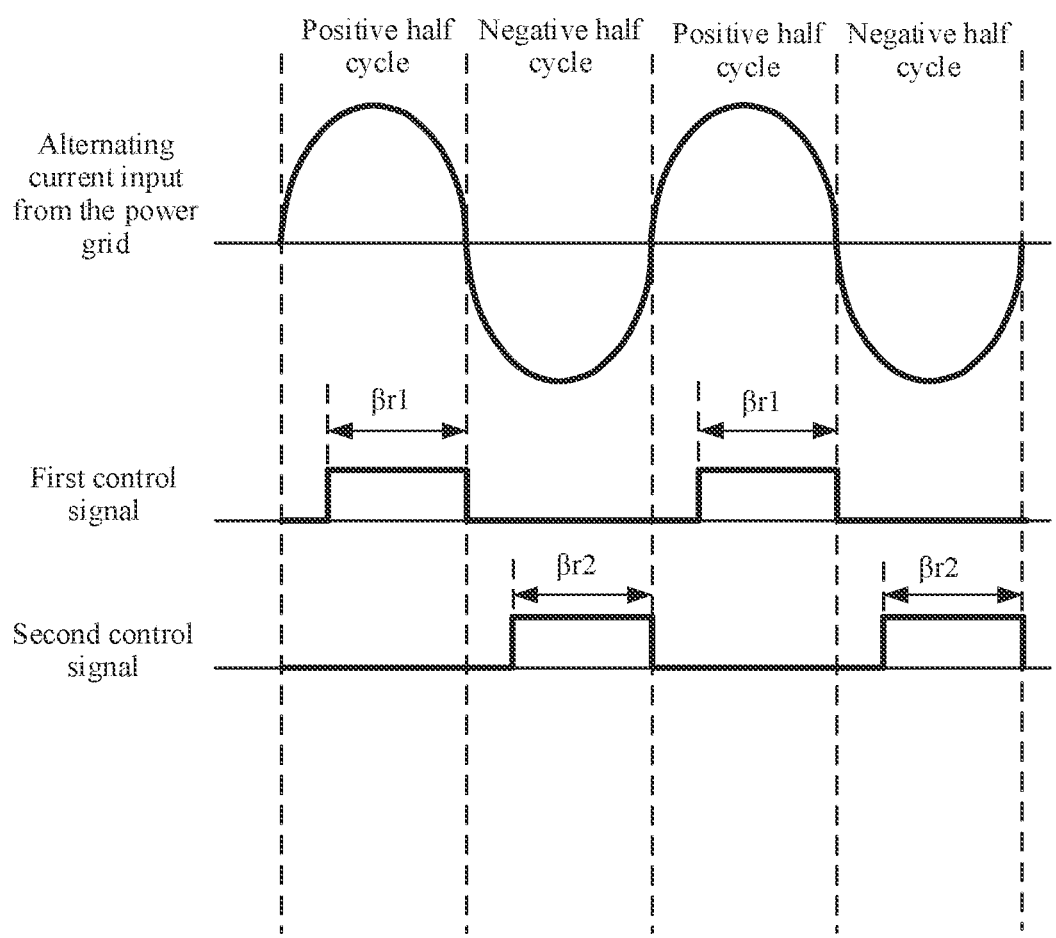
FIG. 6 is a schematic diagram of a control signal of a switch in a bypass switch module.

In a possible implementation, the control module provides, in the collection period based on a preset first conduction angle $\beta r1$, a first control signal to the switch SCR1. The first conduction angle $\beta r1$ is an electrical angle between a start moment at which a level of a first control signal in the positive half cycle is a first level and an end moment of the positive half cycle. The first level may represent a level used to drive the switch SCR1 and the switch SCR2 to be in the on state. The first control signal may drive the switch SCR1 to transmit, in a period corresponding to a first conduction angle in each positive half cycle, the electric energy provided by the power grid to the output terminal, and drive, in each negative half cycle, the switch SCR1 to be in the off state. As shown in FIG. 6, in a period corresponding to a first conduction angle $\beta r1$ in a positive half cycle of each alternating current, the level of the first control signal is a first level; in a negative half cycle of each alternating current, the level of the first control signal is a second level. The second level is less than a minimum level that can drive the switch SCR1 and the switch SCR2 to be in the on state.

The control module provides, in the collection period based on a preset second conduction angle $\beta r2$, the second control signal to the switch SCR2. The second conduction angle $\beta r2$ is an electrical angle between a start moment at which a level of a second control signal in the negative half cycle is the first level and an end moment of the negative half cycle. The second control signal may drive the switch SCR2 to transmit, in a period corresponding to a second conduction angle in each negative half cycle, the electric energy provided by the power grid to the output terminal, and drive, in each positive half cycle, the switch SCR2 to be in the off state. As shown in FIG. 6, in the period corresponding to a second conduction angle $\beta r2$ in a negative half cycle of each alternating current, the level of the second control signal is the first level; in the positive half cycle of each alternating current, the level of the second control signal is the second level.

Generally, the first conduction angle $\beta r1$ may be less than or equal to 180°, and the second conduction angle $\beta r2$ may be less than or equal to 180°. In some examples, to enable a waveform of the current output by the UPS to the load in the collection period to be a sine wave, the preset first conduction angle $\beta r1$ and the preset second conduction angle $\beta r2$ may be equal to 180°, that is, equal to electrical angles of the positive half cycle and the negative half cycle. In this case, in the positive half cycle of each alternating current, a level of a first control signal is the first level; and in the negative half cycle of each alternating current, the level of the first control signal is the second level. A level of a second control signal in the positive half cycle of each alternating current is the second level, and a level of a second control signal in the negative half cycle of each alternating current is the first level.

The control module performs the current equalization control on the bypass switch module in the current equalization period. Control modules in each UPS may communicate with each other, for example, in a wireless communication or wired communication manner. The control module may obtain, by communicating with another control module, information such as a current (collected in the collection period) between the output terminals of another UPS and the load. It should be noted that a manner in which the control module in the UPS obtains the information such as the current between the output terminal of another UPS and the load includes but is not limited to a manner provided in this application, and the information may alternatively be obtained in another manner. This is not limited in this application.

The control module performs the current equalization control on the bypass switch module in the current equalization period. The control module may determine, based on a current (collected by each UPS in the collection period) between the output terminal of each UPS and the second node, whether to adjust an equalization current output by the bypass switch module to the output terminal M2. This process may also be referred to as current equalization adjustment.

Each UPS may perform the following current equalization adjustment method provided in this embodiment of this application. Alternatively, Each UPS may perform another current equalization adjustment method. This is not limited in this application.

In an example, when performing the current equalization adjustment, each UPS in the power supply system may adjust, based on currents output by output terminals of all UPSs and a second current output by the output terminals of the UPSs, the duration in which the bypass switch module connects the power grid to the load.

If the second current is a minimum value of the currents output by the output terminals of all the UPSs, each UPS may control the duration in which the bypass switch module connects the power grid to the load to be equal to a duration of the current equalization period. For example, the control module may control, by a control mode of the bypass switch module in the collection period, the bypass switch module in the current equalization period. That is, the control module does not change the control mode of the bypass switch module in the current equalization period. The control module may drive the switch SCR1 based on a first control signal provided to the switch SCR1 in the collection period, and drive the switch SCR2 based on a second control signal provided to the switch SCR2 in the collection period.

If the second current is greater than the minimum value, the control module may reduce, based on a duration of the current equalization period, the duration in which the bypass switch module connects the power grid to the load.

In an example, when performing the current equalization adjustment, each UPS in the power supply system may adjust, based on currents output by bypass switch modules of all UPSs and a third current output by the bypass switch modules, the duration in which the bypass switch module connects the power grid to the load.

If the third current is a minimum value of the currents output by the bypass switch modules of all the UPSs, the control module may control the duration in which the bypass switch module connects the power grid to the load to be equal to a duration of the current equalization period. For example, the control module may control, by the control mode of the bypass switch module in the collection period, the bypass switch module in the current equalization period. That is, the control module does not change the control mode of the bypass switch module in the current equalization period. The control module may drive the switch SCR1 by based on the first control signal provided to the switch SCR1 in the collection period, and drive the switch SCR2 based on the second control signal provided to the switch SCR2 in the collection period.

If the third current is greater than the minimum value, the control module may reduce, based on a duration of the current equalization period, the duration in which the bypass switch module connects the power grid to the load.

In a possible design, the control module may reduce, in the duration of the current equalization period by changing a conduction angle of a control signal of each switch in the bypass switch module, the duration in which the bypass switch module connects the power grid to the load, to decrease the output current of the bypass switch module.

The control module may provide, based on a third conduction angle $\beta 3$, the third control signal to the switch SCR1. The third conduction angle $\beta 3$ is less than the first conduction angle $\beta r1$, and the third conduction angle $\beta r1$ is an electrical angle between a start moment at which a level of the third control signal in the positive half cycle is the first level and an end moment of the positive half cycle. The third control signal may drive the switch SCR1 to transmit, in a period corresponding to a third conduction angle $\beta 3$ in each positive half cycle, the electric energy provided by the power grid to the output terminal M2, and drive, in each negative half cycle, the switch SCR1 to be in the off state.

Alternatively, the control module may provide, based on a fourth conduction angle $\beta 4$, a fourth control signal to the switch SCR2. The fourth conduction angle $\beta 4$ is less than the second conduction angle $\beta r2$. The fourth conduction angle $\beta 4$ is an electrical angle between a start moment at which a level of a fourth control signal in the negative half cycle is the first level and an end moment of the negative half cycle. The fourth control signal is used to drive, in a period corresponding to a fourth conduction angle $\beta 4$ in each negative half cycle, the switch SCR2 to transmit the electric energy provided by the power grid to the output terminal, and drive, in each positive half cycle, the switch SCR2 to be in the off state.

Alternatively, the control module may change, in the current equalization period, control signals of the switch SCR1 and the switch SCR2, to decrease an equalization current output by the bypass switch module to the output terminal M2. The control module provides the third control signal to the switch SCR1, and provides the fourth control signal to the switch SCR2.

In some examples, if the second current is greater than the minimum value of the output currents of the output terminals of the UPSs, the control module may determine, in a preset manner based on a difference between the second current and the minimum value of the output currents of the output terminals of the UPSs, a conduction angle in the current equalization period. For example, a smaller difference between the second current and the minimum value indicates a smaller difference between the determined third conduction angle (or the fourth conduction angle) and the determined first conduction angle (or the second conduction angle). A larger difference between the second current and the minimum value indicates a larger difference between the determined third conduction angle (or the fourth conduction angle) and the determined first conduction angle (or the second conduction angle).

In the power supply system, there is a current output by an output terminal M2 of at least one UPS that is the smallest current output by the output terminal M2 of each UPS. In this case, the at least one UPS may control, by the control mode of the bypass switch module in the collection period, the bypass switch module in the current equalization period. Other UPSs may adjust the control mode of the bypass switch module, to decrease a current output by the output terminal M2 of the UPS to the load.

Similarly, if the third current is greater than the minimum value of the output currents of the bypass switch modules of all the UPSs, the control module may determine, in the preset manner based on a difference between the third current and the minimum value of the output currents of the bypass switch modules of all the UPSs, the conduction angle in the current equalization period. For example, a smaller difference between the third current and the minimum value indicates a smaller difference between the determined third conduction angle (or the fourth conduction angle) and the determined first conduction angle (or the second conduction angle). A larger difference between the third current and the minimum value indicates a larger difference between the determined third conduction angle (or the fourth conduction angle) and the determined first conduction angle (or the second conduction angle).

In the power supply system, there is a current output by the bypass switch module of the at least one UPS that is the smallest current output by a bypass switch module of each UPS. In this case, the at least one UPS may control, by the control mode of the bypass switch module in the collection period, the bypass switch module in the current equalization period. Other UPSs may adjust the control mode of the bypass switch module, to decrease a current output by the bypass switch module of the UPS to the load.

In the power supply system, each UPS performs the current equalization adjustment in each current equalization period of the first duration. In this design, currents output by output terminals of UPSs in each first duration can be equalized, or the output currents of the bypass switch modules of the UPSs can be equalized.

Figure 7:
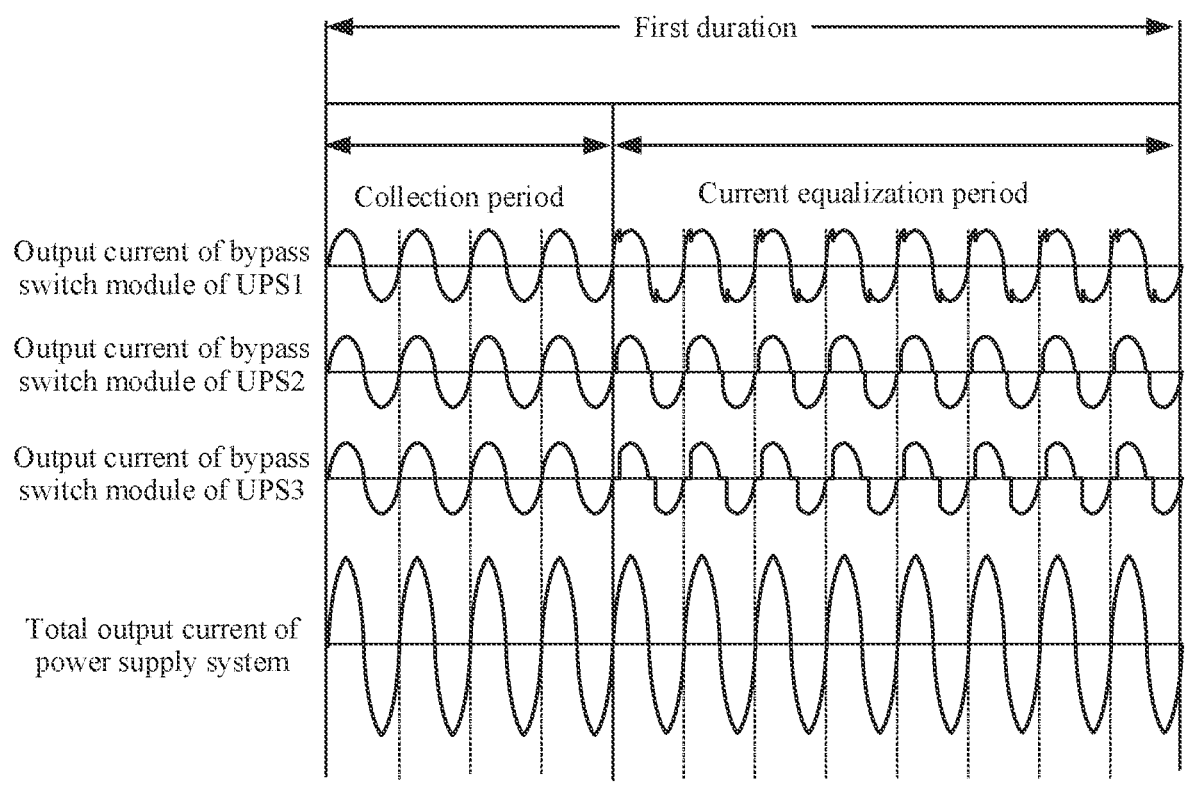
FIG. 7 is a schematic diagram of an output current of each UPS and an output current of a power supply system according to an example embodiment.

Based on the control mode of each switch in the bypass switch module performed by the control module, as shown in FIG. 7, it is assumed that the power supply system includes three UPSs, such as a UPS1, a UPS2, and a UPS3. Conduction angles of control signals provided by the control module of each UPS to the switch SCR1 and the switch SCR2 in the collection period are 180°. Therefore, the waveform of the current output by the bypass switch module of each UPS to the load is a sine wave. A current output by a bypass switch module of the UPS1 is the smallest current output by the output terminal of the bypass switch module of each UPS. The UPS2 changes, in the current equalization period, the conduction angles of the control signals provided to the switch SCR1 and the switch SCR2. Because conduction moments of the switch SCR1 and the switch SCR2 are changed, a waveform of a current output by the UPS2 is not a sine wave, and a current is output only in a period corresponding to the conduction angle of the switch SCR1 and a period corresponding to the conduction angle of the switch SCR2. Similarly, the UPS3 changes, in the current equalization period, the conduction angles of the control signals provided to the switch SCR1 and the switch SCR2. Because conduction moments of the switch SCR1 and the switch SCR2 are changed, a waveform of a current output by the UPS3 is not a sine wave, and the current is output only in the period corresponding to the conduction angle of the switch SCR1 and the period corresponding to the conduction angle of the switch SCR2. The UPS1, in the current equalization period, maintains the control signals provided to the switch SCR1 and the switch SCR2 in the collection period. Because the currents output by the UPS2 and the UPS3 are changed, a waveform of a current output by the UPS1 is affected. However, a waveform of a current output by the power supply system to the load is a sine wave.

In another possible implementation, the collection period may include a plurality of alternating current cycles, and the current equalization period may include a plurality of alternating current cycles. The control module controls, in all alternating current cycles in the alternating current cycles in the collection period, the bypass switch module to connect the power grid to the load.

The control module may adjust, by providing a fifth control signal to the control terminal of the switch SCR1 in the collection period, an on/off state of the switch SCR1, to enable the switch SCR1 to transmit, in all the positive half cycles of the alternating current, the electric energy provided by the power grid to the output terminal, and enable the switch SCR1 to be in the off state in each negative half cycle of the alternating current. A level of the fifth control signal is the first level in the positive half cycle of each alternating current and the second level in the negative half cycle of each alternating current. A conduction angle of the fifth control signal may be 180°.

The control module may adjust, by inputting a sixth control signal to the control terminal of the switch SCR2, an on/off state of the switch SCR2, to enable the switch SCR2 to transmit, in all the negative half cycles, the electric energy provided by the power grid to the output terminal, and enable the switch SCR2 to be in the off state in each positive half cycle. A level of the sixth control signal is the first level in the negative half cycle of each alternating current and the second level in the positive half cycle of each alternating current. A conduction angle of the sixth control signal may be 180°.

In an example, when performing the current equalization adjustment, each UPS in the power supply system may adjust, based on the currents output by the output terminals of all UPSs and the second current output by the output terminals of the UPSs, the duration in which the bypass switch module connects the power grid to the load.

If the second current is a minimum value of the currents output by the output terminals of all the UPSs, each UPS may control the duration in which the bypass switch module connects the power grid to the load to be equal to a duration of the current equalization period. For example, the control module may control, by the control mode of the bypass switch module in the collection period, the bypass switch module in the current equalization period. That is, the control module does not change the control mode of the bypass switch module in the current equalization period. The control module may drive the switch SCR1 based on the fifth control signal provided to the switch SCR1 in the collection period, and drive the switch SCR2 based on the sixth control signal provided to the switch SCR2 in the collection period.

If the second current is greater than the minimum value, the control module may reduce, based on the duration of the current equalization period, the duration in which the bypass switch module connects the power grid to the load.

In an example, when performing the current equalization adjustment, each UPS in the power supply system may adjust, based on the currents output by bypass switch modules of all UPSs and the third current output by the bypass switch modules, the duration in which the bypass switch module connects the power grid to the load.

If the third current is a minimum value of the currents output by the bypass switch modules of all the UPSs, the control module may control the duration in which the bypass switch module connects the power grid to the load to be equal to the duration of the current equalization period. For example, the control module may control, by the control mode of the bypass switch module in the collection period, the bypass switch module in the current equalization period. That is, the control module does not change the control mode of the bypass switch module in the current equalization period. The control module may drive the switch SCR1 based on the fifth control signal provided to the switch SCR1 in the collection period, and drive the switch SCR2 based on the sixth control signal provided to the switch SCR2 in the collection period.

If the third current is greater than the minimum value, the control module may reduce, based on the duration of the current equalization period, the duration in which the bypass switch module connects the power grid to the load.

The control module controls, based on the duration of the current equalization period (also based on all alternating current cycles in the current equalization period), switches in a part of alternating current cycles to be in the on state, to reduce the duration in which the bypass switch module connects the power grid to the load, and decrease the current output by the bypass switch module. For example, the control module may control, in a part of alternating current cycles in the alternating current cycles in the current equalization period, the bypass switch module to output the current, and control, in another part of alternating current cycles, the bypass switch module not to output the current, to decrease the duration in which the bypass switch module connects the power grid to the load, and decrease the current output by the bypass switch module to the output terminal.

The control module may adjust, by providing a seventh control signal to the SCR1, the on/off state of the SCR1, to enable the SCR1 to transmit, in a part of the positive half cycles of the alternating current, electric energy provided by the power grid to the output terminal, and enable the SCR1 to be in the off state in each negative half cycle of the alternating current. For example, it is assumed that the current equalization period includes N alternating current cycles, the control module may control, in a positive half cycle of another alternating current cycle other than a positive half cycle of I alternating current cycles, the switch SCR1 to be in the on state, and control, in the positive half cycle of the I alternating current cycles, the switch SCR1 to be in the off state.

The control module may adjust, by providing an eighth control signal to the SCR2, the on/off state of the SCR2, to enable the SCR2 to transmit, in a part of the negative half cycles, electric energy provided by the power grid to the output terminal, and enable the SCR2 to be in the off state in each positive half cycle. For example, it is assumed that the current equalization period includes N alternating current cycles, the control module may control, in a negative half cycle of another alternating current cycle other than a negative half cycle of J alternating current cycles, the switch SCR2 to be in the on state, and control, in the negative half cycle of the J alternating current cycles, the switch SCR2 to be in the off state.

In some examples, I is equal to J, and the J alternating current cycles are equal to the I alternating current cycles. That is, the control module may control, in a part of the alternating current cycles in the current equalization period, the switch SCR1 and the switch SCR2 are in the off state.

Figure 8:
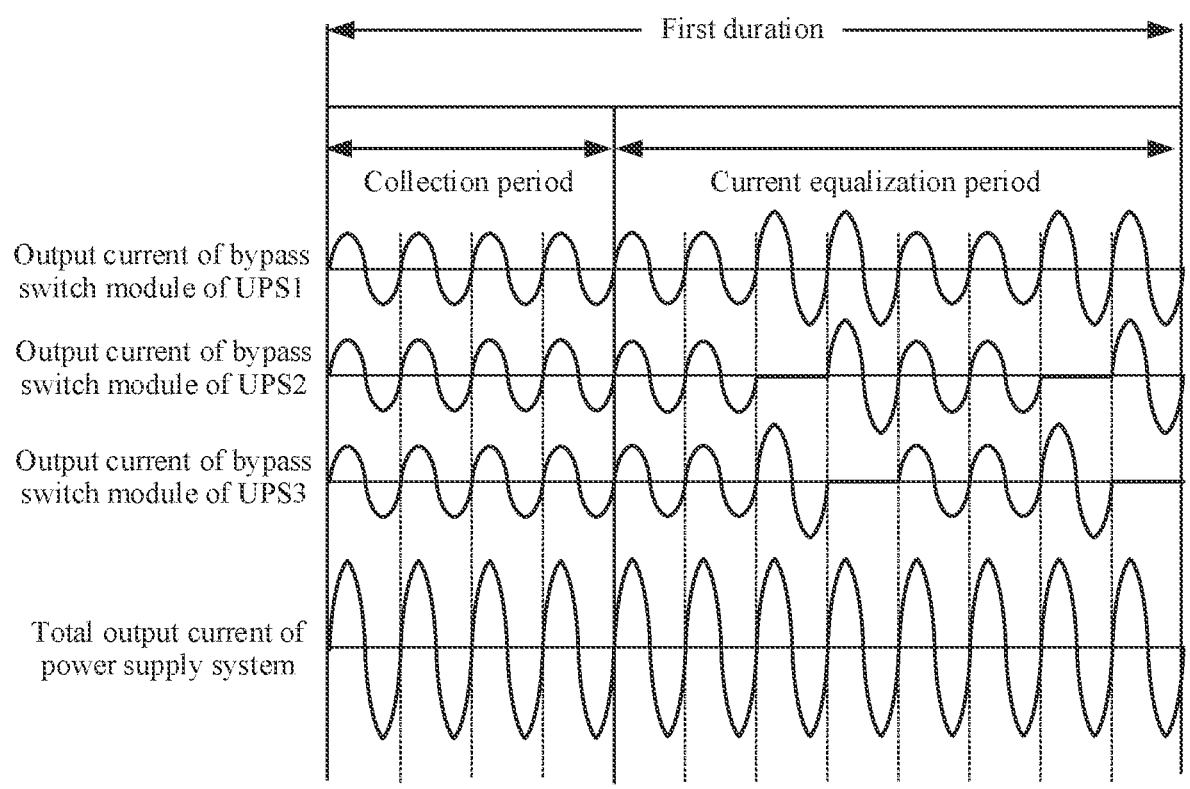
FIG. 8 is a schematic diagram of an output current of each UPS and an output current of a power supply system according to an example embodiment.

In the power supply system, each UPS performs the current equalization adjustment in each current equalization period of the first duration. In this design, the currents output by output terminals of UPSs in each first duration can be equalized, or the output currents of the bypass switch modules of the UPSs can be equalized. As shown in FIG. 8, it is assumed that the power supply system includes three UPSs, such as a UPS1, a UPS2, and a UPS3. The current output by the bypass switch module of the UPS1 is the smallest current output by the bypass switch module of each UPS. The current equalization period includes a plurality of alternating current cycles. The UPS2 controls, in a part of alternating current cycles in the current equalization period, the switch SCR1 and the switch SCR2 to be in the off state, to enable a current output by the UPS2 to the load in the part of alternating current cycles to be 0. The UPS2 controls, in a positive half cycle of the other part of alternating current cycles, the switch SCR1 to be in the on state, and controls, in a negative half cycle of the other part of alternating current cycles, the control switch SCR2 to be in the on state, to enable the UPS2 to input a sine current to the load in the other part of alternating current cycles. Similarly, the UPS3 controls, in a part of alternating current cycles in the current equalization period, the switch SCR1 and the switch SCR2 to be in the off state, to enable a current output by the UPS3 to the load in the part of alternating current cycles is 0. The UPS3 controls, in the positive half cycle of the other part of alternating current cycles, the switch SCR1 to be in the on state, and controls, in the negative half cycle of the other part of alternating current cycles, the control switch SCR2 to be in the on state, to enable the UPS3 to input a sine current to the load in the other part of alternating current cycles. The UPS1, in the current equalization period, maintains the control signals provided to the switch SCR1 and the switch SCR2 in the collection period. Because the currents output by the UPS2 and the UPS3 are changed, the waveform of the current output by the UPS1 is affected. However, the waveform of the current output by the power supply system to the load is a sine wave. Generally, different UPSs controls, in the alternating current cycle in the current equalization period, the control switch SCR1 and the switch SCR2 to be in the off state.

Based on any one of the current equalization adjustment methods, or other current equalization adjustment methods, the control module of each UPS may further control, in the current equalization period, the direct current to alternating current conversion module to output the first compensation current. A harmonic component and/or a reactive current component caused by the load enters each UPS. A harmonic component and/or a reactive current component caused by the load at each UPS may be different. In this application, each UPS compensates a harmonic component and/or a reactive current component that is caused by the load and enters the UPS, for example, outputs a compensation current. Compensation currents output by all the UPSs can compensate a harmonic component and/or a reactive current component caused by a load in the power grid. This minimizes the pollution to the power grid.

For any first duration, the control module may determine, based on a current at a collection point in the collection period, a harmonic component and/or a reactive current component of a collected current. The collection point may be disposed between the first node and the second node, for example, an input terminal or an output terminal of a UPS to which the control module belongs, any point between the input terminal and the first node, any point between the output terminal and the second node, or any point on a branch in which the bypass switch module is disposed between the input terminal and the output terminal.

In the current equalization period, the direct current to alternating current conversion module is controlled to output a first compensation current used to compensate the harmonic component and/or the reactive current component. In the collection period, because the current output by the UPS to the load is close to the current input by the power grid, there is a low probability that the harmonic component or the reactive current component in a collected current is caused by the UPS itself. Therefore, in the collection period, the harmonic component or the reactive current component of the current collected at the collection point is mainly caused by the load, and the harmonic component or the reactive current component caused by the load enters each UPS. This design improves compensation effect of the first compensation current output by the direct current to alternating current conversion module under control of the control module on the harmonic component and/or the reactive current component, thereby minimizing the pollution to the power grid.

The control module may control, in the collection period, the direct current to alternating current conversion module to output a second compensation current. For example, the control module may control, in the collection period based on a predetermined harmonic component and/or reactive current component, the direct current to alternating current conversion module to output the second compensation current. The second compensation current includes a second compensation reactive current component and/or a second quantity of second compensation harmonic components. The second quantity may be less than or equal to a quantity of the predetermined harmonic components. Frequency of one second compensation reactive current component in the second quantity of second compensation harmonic components, and one harmonic component in the quantity of predetermined harmonic components have a same frequency and opposite amplitudes. It can be learned that each second compensation harmonic component in the second quantity may compensate some or all of the predetermined harmonic components. The second compensation reactive current component and the predetermined reactive current component have a same frequency and opposite amplitudes. The second compensation reactive current component may compensate the predetermined reactive current component. The predetermined harmonic component and/or reactive current component are/is determined based on a current collected at a collection point in a collection period in a second duration. An end moment of the second duration is a start moment of the first duration. For example, in (b) in FIG. 5, an end moment of the first duration (may be referred as the second duration) in a control period 1 is a start moment of the first duration in a control period 2. The control module may determine the harmonic component and/or the reactive current component based on a current collected at a collection point in a collection period in the control period 1. The control module may control, in the collection period in the control period 2, the direct current to alternating current conversion module to output the second compensation current. The second compensation current may be used to compensate the harmonic component and/or the reactive current component determined based on the current collected at the collection point in the collection period in the control period 1.

It can be learned that each UPS not only can output the compensation current in the current equalization period in the first duration, but also can output the compensation current in both the collection period and the current equalization period.

Figure 9:
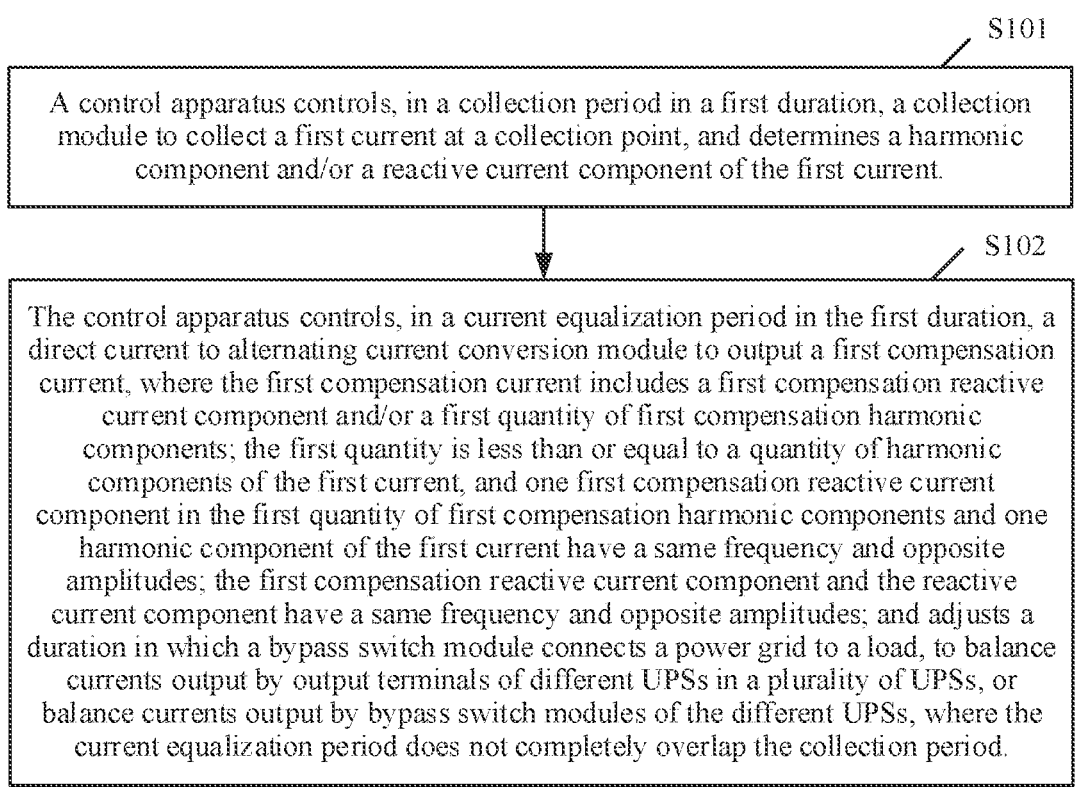
FIG. 9 is a schematic diagram of a power supply method.

Based on the foregoing example, as shown in FIG. 9, this application further provides a power supply method. The method may be applied to a UPS in a power supply system. The power supply system includes a plurality of parallelly-connected UPSs. As shown in FIG. 2A, FIG. 2B, and FIG. 2C, an input terminal of each UPS is connected to a power grid by using a first node, and an output terminal of each UPS is connected to a load by using a second node. The power grid is configured to provide an alternating current to each UPS. As shown in FIG. 2A, FIG. 2B, and FIG. 2C, the UPS includes at least a control module, a bypass switch module, a direct current to alternating current conversion module, and a collection module. One terminal of the bypass switch module is connected to the input terminal, and the other terminal of the bypass switch module is connected to the output terminal. The collection module is connected to a collection point, the collection point is disposed between the first node and the second node, and the direct current to alternating current conversion module is connected to the output terminal.

This application further provides a control apparatus. The control apparatus may be disposed in a control module of the UPS. The power supply method may be performed by a control apparatus in each UPS in the power supply system. The control apparatus is connected to the bypass switch module, the collection module, and the direct current to alternating current conversion module, and is configured to perform the power supply method provided in this application. Referring to FIG. 9, the power supply method may include the following steps.

Step S101: A control apparatus controls, in a collection period in a first duration, a collection module to collect a first current at a collection point, and determines a harmonic component and/or a reactive current component of the first current.

Step S102: The control apparatus controls, in a current equalization period in the first duration, the direct current to alternating current conversion module to output a first compensation current, where the first compensation current includes a first compensation reactive current component and/or a first quantity of first compensation harmonic components, where the first quantity is less than or equal to a quantity of harmonic components of the first current, one first compensation reactive current component in the first quantity of first compensation harmonic components and one harmonic component of the first current have a same frequency and opposite amplitudes, and the first compensation reactive current component and the reactive current component have a same frequency and opposite amplitudes; and adjusts a duration in which the bypass switch module connects the power grid to the load, to balance currents output by output terminals of different UPSs in the plurality of UPSs, or balance currents output by bypass switch modules of the different UPSs, where the current equalization period does not completely overlap the collection period.

In a possible design, before the control apparatus controls the direct current to alternating current conversion module to output the first compensation current that is used for compensating the harmonic component and/or the reactive current component of the first current, the control apparatus further controls, in the collection period based on a predetermined harmonic component and/or reactive current component, the direct current to alternating current conversion module to output a second compensation current. The second compensation current includes a second compensation reactive current component and/or a second quantity of second compensation harmonic components. The second quantity is less than or equal to a quantity of predetermined harmonic components. One second compensation reactive current component in the second quantity of second compensation harmonic components and one harmonic component of the predetermined harmonic components have a same frequency and opposite amplitudes. The second compensation reactive current component and the predetermined reactive current component have a same frequency and opposite amplitudes. It can be learned that the second compensation current may be used to compensate for the predetermined harmonic component and/or reactive current component. The predetermined harmonic component and/or reactive current component are/is determined based on a current collected at a collection point in a collection period in a second duration. An end moment of the second duration is a start moment of the first duration.

In a possible design, in an operation in which the control apparatus adjusts the duration in which the bypass switch module connects the power grid to the load, the control apparatus may perform the following processes such as adjusting, based on currents output by output terminals of all UPSs and a second current output by the output terminals of the UPSs, the duration in which the bypass switch module connects the power grid to the load; or adjusting, based on currents output by bypass switch modules of all UPSs and a third current output by the bypass switch modules, the duration in which the bypass switch module connects the power grid to the load.

In an example, in the operation in which the control apparatus adjusts, based on currents output by output terminals of all UPSs and a second current output by the output terminals of the UPSs, the duration in which the bypass switch module connects the power grid to the load, the control apparatus may perform the following processes. If the second current is a minimum value of the currents output by the output terminals of all the UPSs, controlling the duration in which the bypass switch module connects the power grid to the load to be equal to a duration of the current equalization period; or if the second current is greater than the minimum value, reducing, based on a duration of the current equalization period, the duration in which the bypass switch module connects the power grid to the load.

In another example, in the operation in which the control apparatus adjusts, based on currents output by output terminals of all UPSs and a second current output by the output terminals of the UPSs, the duration in which the bypass switch module connects the power grid to the load, the control apparatus may perform the following processes. If the third current is a minimum value of the currents output by the bypass switch modules of all the UPSs, controlling the duration in which the bypass switch module connects the power grid to the load to be equal to a duration of the current equalization period; or if the third current is greater than the minimum value, reducing, based on a duration of the current equalization period, the duration in which the bypass switch module connects the power grid to the load.

Based on any one of the foregoing designs, the bypass switch module may include a first switch (for example, a switch SCR1) and a second switch (for example, a switch SCR2). One terminal of the first switch is connected to the input terminal, and the other terminal is connected to the output terminal. The second switch is connected in parallel to the first switch. A current transmission direction when the first switch is turned on is opposite to a current transmission direction when the second switch is turned. The collection period includes a plurality of alternating current cycles, and each alternating current cycle includes a positive half cycle and a negative half cycle. Generally, the alternating current cycle includes a positive half cycle and a negative half cycle.

In a possible implementation, the control apparatus may further perform the following process such as providing, in the collection period based on a preset first conduction angle, a first control signal to the first switch, where the first conduction angle is an electrical angle between a start moment at which a level of the first control signal in the positive half cycle is a first level and an end moment of the positive half cycle; the first level is a level that is used to drive the first switch to be in an on state; the first control signal is used to drive, in a period corresponding to the first conduction angle in each positive half cycle, the first switch to connect the power grid to the load, and drive, in each negative half cycle, the first switch to be in an off state; or providing, based on a preset second conduction angle, a second control signal to the second switch, where the second conduction angle is an electrical angle between a start moment at which a level of the second control signal in the negative half cycle is a first level and an end moment of the negative half cycle; the first level is a level used to drive the second switch to be in an on state; and the second control signal is used to drive, in a period corresponding to the second conduction angle in each negative half cycle, the second switch to connect the power grid to the load, and drive, in each positive half cycle, the second switch to be in an off state. In some examples, the first conduction angle may be equal to an electrical angle at the positive half cycle, and the second conduction angle may be equal to an electrical angle at the negative half cycle.

The current equalization period includes a plurality of alternating current cycles. In a possible design, in the operation in which the control apparatus controls, in the current equalization period, the bypass switch module to connect the power grid to the load to be equal to a duration of the current equalization period, the control apparatus may perform the following processes such as providing the first control signal to the first switch; and providing the second control signal to the second switch.

In the operation in which the control apparatus reduces, based on the duration of the current equalization period, the duration in which the bypass switch module connects the power grid to the load, the control apparatus may perform the following processes such as providing, based on a third conduction angle, a third control signal to the first switch, where the third conduction angle is less than the first conduction angle, and the third conduction angle is an electrical angle between a start moment at which a level of the third control signal in the positive half cycle is the first level and the end moment of the positive half cycle; and the third control signal is used to drive, in a period corresponding to the third conduction angle in each positive half cycle, the first switch to connect the power grid to the load, and drive, in each negative half cycle, the first switch to be in the off state; or providing, based on a fourth conduction angle, a fourth control signal to the second switch, where the fourth conduction angle is less than the second conduction angle, and the fourth conduction angle is an electrical angle between a start moment at which a level of the fourth control signal in the negative half cycle is the first level and the end moment of the negative half cycle; and the fourth control signal is used to drive, in a period corresponding to the fourth conduction angle in each negative half cycle, the second switch to connect the power grid to the load, and drive, in each positive half cycle, the second switch to be in the off state; or providing the third control signal to the first switch, and provide the fourth control signal to the second switch.

In another implementation, the control apparatus may further be configured to, in the collection period, adjust, by providing a fifth control signal to the control terminal of the first switch, an on/off state of the first switch, to enable the first switch to connect the power grid to the load in positive half cycles of all the alternating currents, and enable the first switch to be in the off state in each negative half cycle of each alternating current; or adjust, by inputting a sixth control signal to the control terminal of the second switch, an on/off state of the second switch, to enable the second switch to connect the power grid to the load in all the negative half cycles, and enable the second switch to be in the off state in each positive half cycle.

The current equalization period includes a plurality of alternating current cycles. In the operation in which the control apparatus controls, in the current equalization period, the bypass switch module to connect the power grid to the load to be equal to a duration of the current equalization period, the control apparatus may perform the following processes such as, the control module provides the fifth control signal to the first switch. The control module provides the sixth control signal to the second switch.

In the operation in which the control apparatus reduces, based on the duration of the current equalization period, the duration in which the bypass switch module connects the power grid to the load, the control apparatus may perform the following processes such as adjusting, by providing a seventh control signal to the first switch, an on/off state of the first switch, to enable the first switch to connect the power grid to the load in a part of the positive half cycles of the alternating current, and enable the first switch to be in the off state in each negative half cycle of each alternating current; or adjusting, by the control module, by providing an eighth control signal to the second switch, an on/off state of the second switch, to enable the second switch to connect the power grid to the load in a part of the negative half cycle, and enable the second switch to be in the off state in each positive half cycle.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), a semiconductor medium (solid-state drive (SSD)), or the like.

An embodiment of this application further provides a computer-readable storage medium, configured to store the method or algorithm provided in the foregoing embodiments. For example, a random-access memory (RAM), a flash memory, a read-only memory (ROM), an erasable programmable ROM (EPROM) memory, a non-volatile ROM, a register, a hard disk, a removable magnetic disk, or a storage medium of any other form in the art.

Steps of the methods or algorithms described in the embodiments of this application may be directly embedded into the control apparatus. The control apparatus may include a RAM memory, a flash memory, a ROM memory, an EPROM memory, a register, a hard disk, a removable magnetic disk, or a storage medium in any other form in the art, and is configured to store steps of methods or algorithms provided in embodiments of this application. For example, the storage medium may be connected to a processor (or a controller) in the control apparatus, so that the processor (or the controller) may read information from the storage medium and write information to the storage medium. Optionally, the storage medium may be further integrated into the processor (or the controller).

These computer program instructions may also be loaded onto a computer or another programmable data processing device, so that a series of operations and steps are performed on the computer or another programmable device, thereby generating computer-implemented processing. Therefore, the instructions executed on the computer or another programmable device provide steps for implementing a function in one or more processes in the flowcharts and/or in one or more blocks in the block diagrams.

Clearly, a person skilled in the art can make various modifications and variations to this application without departing from the protection scope of this application. This application is intended to cover these modifications and variations of this application provided that they fall within the scope of protection defined by the following claims and their equivalent technologies.

What is claimed is:

1. A power supply system, comprising:
an uninterruptible power supply (UPS) comprising:
an input terminal configured to:
couple to a power grid using a first node, and
receive an alternating current from the power grid;
an output terminal configured to couple to a load using a second node;
a bypass switch circuit comprising:
a first terminal coupled to the input terminal; and
a second terminal coupled to the output terminal, wherein the bypass switch circuit is configured to connect the power grid to the load;
a direct current to alternating current (DC-AC) conversion circuit, wherein the DC-AC conversion circuit is connected to the output terminal, and wherein the DC-AC conversion circuit is configured to:
receive a first control instruction; and
output a current to the output terminal in response to the first control instruction;
a collection point node disposed between the first node and the second node;
a collection circuit connected to the collection point node, wherein the collection circuit is configured to:
receive a second control instruction; and
collect a current at the collection point node in response to the second control instruction; and
a control circuit configured to:
send the first control instruction to the DC-AC conversion circuit;
send the second control instruction to the collection circuit;
control, in a collection period in a first duration, the collection circuit to collect a first current at the collection point node;
determine at least one of a harmonic component or a reactive current component of the first current;
control, in a current equalization period in the first duration, the DC-AC conversion circuit to output a first compensation current, wherein the current equalization period partially overlaps the collection period, wherein the first compensation current comprises at least one of a first compensation reactive current component or a first quantity of first compensation harmonic components, wherein the first quantity is less than or equal to a second quantity of harmonic components of the first current, wherein the first compensation reactive current component in the first quantity of first compensation harmonic components has a same frequency and an opposite amplitude as the harmonic component of the first current, and wherein the first compensation reactive current component has a same frequency and an opposite amplitude as the reactive current component; and
adjust a second duration in which the bypass switch circuit connects the power grid to the load to balance second currents output by output terminals of different UPSs in a plurality of UPSs or balance third currents output by bypass switch circuits of the different UPSs.

2. The power supply system of claim 1, wherein the control circuit is further configured to control, in the collection period based on at least one of a predetermined harmonic component or a predetermined reactive current component, the DC-AC conversion circuit to output a second compensation current, wherein the second compensation current comprises at least one of a second compensation reactive current component or a third quantity of second compensation harmonic components, wherein the third quantity is less than or equal to a fourth quantity of predetermined harmonic components, wherein one second compensation reactive current component in the third quantity of second compensation harmonic components and one harmonic component of the predetermined harmonic components have a same frequency and opposite amplitudes, wherein the second compensation reactive current component and the predetermined reactive current component have a same frequency and opposite amplitudes, wherein at least one of the predetermined harmonic component or the predetermined reactive current component is based on the current at the collection point node in a collection period in a third duration, and wherein an end moment of the third duration is a start moment of the first duration.

3. The power supply system of claim 1, wherein the control circuit is further configured to adjust, based on fourth currents output by output terminals of all the plurality of UPSs and a fifth current output by the output terminals of the plurality of the UPSs, the second duration when the control circuit adjusts the second duration in the current equalization period.

4. The power supply system of claim 1, wherein the control circuit is further configured to adjust, based on currents output by the bypass switch circuits of all the plurality of UPSs and a third current output by the bypass switch circuits, the second duration when the control circuit adjusts the second duration in the current equalization period.

5. The power supply system of claim 3, wherein when the control circuit adjusts, based on the fourth currents and the fifth current, the second duration, the control circuit is further configured to control the second duration to be equal to a third duration of the current equalization period when the fifth current is a minimum value of the fourth currents.

6. The power supply system of claim 3, wherein, when the control circuit adjusts, based on the fourth currents and the fifth current, the second duration, the control circuit is further configured to reduce, based on a third duration of the current equalization period, the second duration when the fifth current is greater than a minimum value of the fourth currents.

7. The power supply system of claim 3, wherein when the control circuit adjusts, based on sixth currents output by the bypass switch circuits of all the plurality of UPSs and a seventh current output by the bypass switch circuits, the second duration, the control circuit is further configured to control the second duration to be equal to a third duration of the current equalization period when the seventh current is a minimum value of the sixth currents.

8. The power supply system of claim 3, wherein when the control circuit adjusts, based on sixth currents output by the bypass switch circuits of all the plurality UPSs and a seventh current output by the bypass switch circuits, the second duration, the control circuit is further configured to reduce, based on a third duration of the current equalization period, the second duration when the seventh current is greater than a minimum value of the sixth currents.

9. The power supply system of claim 6, wherein the bypass switch circuit further comprises:
a first switch comprising the first terminal connected to the input terminal, and wherein the first switch comprises a first switch control terminal;
a second switch comprising the second terminal connected to the output terminal, wherein the second switch is connected in parallel to the first switch, and wherein the second switch comprises a second switch control terminal; and
wherein the control circuit is separately connected to the first switch control terminal and to the second switch control terminal,
wherein a first current transmission direction when the first switch is turned on is opposite to a second current transmission direction when the second switch is turned on, wherein the collection period comprises a plurality of alternating current cycles,
wherein each alternating current cycle of the plurality of alternating current cycles comprises a positive half cycle and a negative half cycle, and
wherein the control circuit is further configured to provide, in the collection period based on a first conduction angle that is preset, a first control signal to the first switch, wherein the first conduction angle is an electrical angle between a start moment at which a level of the first control signal in the positive half cycle is a first level and an end moment of the positive half cycle, wherein the first level is a level that is configured to drive the first switch to be in an on state, and wherein the first control signal is configured to:
drive, in a period corresponding to the first conduction angle in each positive half cycle, the first switch to connect the power grid to the load; and
drive, in each negative half cycle, the first switch to be in an off state.

10. The power supply system of claim 9, wherein the control circuit is further configured to provide, based on a second conduction angle that is preset, a second control signal to the second switch, wherein the second conduction angle is an electrical angle between a start moment at which a level of the second control signal in the negative half cycle is a first level and an end moment of the negative half cycle, wherein the first level is a level configured to drive the second switch to be in an on state, and wherein the second control signal is configured to:
drive, in a period corresponding to the second conduction angle in each negative half cycle, the second switch to connect the power grid to the load; and
drive, in each positive half cycle, the second switch to be in an off state.

11. The power supply system of claim 10, wherein the first conduction angle is equal to an electrical angle of the positive half cycle, and wherein the second conduction angle is equal to an electrical angle of the negative half cycle.

12. The power supply system of claim 10, wherein the current equalization period comprises a plurality of second alternating current cycles, wherein, when the control circuit controls, in the current equalization period, the second duration to be equal to the third duration of the current equalization period, the control circuit is further configured to:
provide the first control signal to the first switch; and
provide the second control signal to the second switch.

13. The power supply system of claim 9, wherein the current equalization period comprises the plurality of second alternating current cycles, wherein when the control circuit reduces, in the current equalization period based on a duration of the current equalization period, the second duration, the control circuit is further configured to:
provide, based on a second conduction angle, a second control signal to the first switch, wherein the second conduction angle is less than the first conduction angle, wherein the second conduction angle is an electrical angle between a start moment at which a level of the second control signal in the positive half cycle is the first level and the end moment of the positive half cycle, and
wherein the second control signal is configured to:
drive, in a period corresponding to the second conduction angle in each positive half cycle, the first switch to connect the power grid to the load; and drive, in each negative half cycle, the first switch to be in the off state.

14. The power supply system of claim 10, wherein the current equalization period comprises the plurality of second alternating current cycles, wherein when the control circuit reduces, in the current equalization period based on a duration of the current equalization period, the second duration, the control circuit is further configured to:
provide, based on a third conduction angle, a third control signal to the second switch, wherein the third conduction angle is less than the second conduction angle, and the third conduction angle is an electrical angle between a start moment at which a level of the third control signal in the negative half cycle is the first level and the end moment of the negative half cycle, and
wherein the third control signal is configured to:
drive, in a period corresponding to the third conduction angle in each negative half cycle, the second switch to connect the power grid to the load; and
drive, in each positive half cycle, the second switch to be in the off state.

15. The power supply system of claim 7, wherein the bypass switch circuit further comprises:
a first switch connected to the input terminal, and wherein the first switch comprises a first switch control terminal; and
a second switch comprising the second terminal connected to the output terminal, wherein the second switch is connected in parallel to the first switch, and wherein the second switch comprises a second switch control terminal;
wherein the control circuit is separately connected to the first switch control terminal and to the second switch control terminal,
wherein a first current transmission direction when the first switch is turned on is opposite to a second current transmission direction when the second switch is turned on,
wherein the collection period comprises a plurality of alternating current cycles,
wherein each alternating current cycle of the plurality of alternating current cycles comprises a positive half cycle and a negative half cycle, and
wherein the control circuit is further configured to adjust, in the collection period by providing a first control signal to the first switch, an on/off state of the first switch, to enable the first switch to connect the power grid to the load in positive half cycles of all the alternating current cycles, and enable the first switch to be in the off state in each negative half cycle of each alternating current cycle.

16. The power supply system of claim 7, wherein the bypass switch circuit further comprises:
a first switch connected to the input terminal, and wherein the first switch comprises a first switch control terminal; and
a second switch comprising the second terminal connected to the output terminal, wherein the second switch is connected in parallel to the first switch, and wherein the second switch comprises a second switch control terminal,
wherein the control circuit is separately connected to the first switch control terminal and to the second switch control terminal,
wherein a first current transmission direction when the first switch is turned on is opposite to a second current transmission direction when the second switch is turned on,
wherein the collection period comprises a plurality of alternating current cycles,
wherein each alternating current cycle of the plurality of alternating current cycles comprises a positive half cycle and a negative half cycle, and
wherein the control circuit is further configured to:
adjust, by inputting a second control signal to the second switch, an on/off state of the second switch, to enable the second switch to connect the power grid to the load in all the negative half cycles, and enable the second switch to be in the off state in each positive half cycle.

17. The power supply system of claim 15, wherein the current equalization period comprises a plurality of second alternating current cycles, wherein when the control circuit controls, in the current equalization period, the second duration to be equal to a duration of the current equalization period, the control circuit is further configured to:
provide the first control signal to the first switch; and
provide a second control signal to the second switch.

18. The power supply system of claim 15, wherein the current equalization period comprises the plurality of second alternating current cycles, wherein when the control circuit reduces, in the current equalization period based on a duration of the current equalization period, the second duration, the control circuit is further configured to:
adjust, by providing a second control signal to the first switch, the on/off state of the first switch, to enable the first switch to transmit, in a part of the positive half cycles of all the second alternating current cycles, electric energy provided by the power grid to the output terminal, and enable the first switch to be in the off state in each negative half cycle of the alternating current; or
adjust, by providing third control signal to the second switch, the on/off state of the second switch, to enable the second switch to transmit, in a part of the negative half cycles, electric energy provided by the power grid to the output terminal, and enable the second switch to be in the off state in each positive half cycle.

19. A power supply method, comprising:
controlling, in a collection period in a first duration, a collection circuit to collect a first current at a collection point node,
determining at least one of a harmonic component or a reactive current component of the first current;
controlling, in a current equalization period in the first duration, a direct current to alternating current (DC-AC) conversion circuit to output a first compensation current, wherein the current equalization period partially overlaps the collection period, wherein the first compensation current comprises at least one of a first compensation reactive current component or a first quantity of first compensation harmonic components, wherein the first quantity is less than or equal to a second quantity of harmonic components of the first current, wherein the first compensation reactive current component in the first quantity of first compensation harmonic components has a same frequency and opposite amplitudes as the harmonic component of the first current, and wherein the first compensation reactive current component has a same frequency and an opposite amplitude as the reactive current component; and adjusting a second duration in which a bypass switch circuit connects a power grid to a load, to balance second currents output by output terminals of different UPSs in a plurality of UPSs, or balance third currents output by bypass switch circuits of the different UPSs.

20. A non-transitory computer-readable storage medium storing computer-executable instructions that when executed by a processor of a control apparatus of an uninterruptible power supply (UPS), cause the control apparatus to be configured to:

control, in a collection period in a first duration, a collection circuit to collect a first current at a collection point node;

determine at least one of a harmonic component or a reactive current component of the first current;

control, in a current equalization period in the first duration, a direct current to alternating current (DC-AC) conversion circuit to output a first compensation current, wherein the current equalization period partially overlaps the collection period, wherein the first compensation current comprises at least one of a first compensation reactive current component or a first quantity of first compensation harmonic components, wherein the first quantity is less than or equal to a second quantity of harmonic components of the first current, wherein the first compensation reactive current component in the first quantity of first compensation harmonic components has a same frequency and opposite amplitudes as the harmonic component of the first current, and wherein the first compensation reactive current component has a same frequency and opposite amplitudes as the reactive current component; and adjust a second duration in which a bypass switch circuit connects a power grid to a load, to balance second currents output by output terminals of different UPSs in a plurality of UPSs, or balance third currents output by bypass switch circuits of the different UPSs.

* * * * *